United States Patent
Saleh et al.

(10) Patent No.: US 10,192,280 B2
(45) Date of Patent: Jan. 29, 2019

(54) PER-VERTEX VARIABLE RATE SHADING

(71) Applicant: QUALCOMM Incorporated, San Diego, CA (US)

(72) Inventors: Skyler Jonathon Saleh, San Diego, CA (US); Vineet Goel, San Diego, CA (US); Maurice Franklin Ribble, Lancaster, MA (US); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 15/434,851

(22) Filed: Feb. 16, 2017

(65) Prior Publication Data
US 2017/0293995 A1    Oct. 12, 2017

Related U.S. Application Data

(60) Provisional application No. 62/320,362, filed on Apr. 8, 2016.

(51) Int. Cl.
| | | |
|---|---|---|
| *G06T 15/00* | (2011.01) | |
| *G06T 1/20* | (2006.01) | |
| *G06T 1/60* | (2006.01) | |

(52) U.S. Cl.
CPC .............. *G06T 1/20* (2013.01); *G06T 1/60* (2013.01); *G06T 15/005* (2013.01); *G06T 2210/36* (2013.01)

(58) Field of Classification Search
CPC .................................................. G06T 15/80
See application file for complete search history.

(56) References Cited

U.S. PATENT DOCUMENTS

| | | | |
|---|---|---|---|
| 8,233,004 B1 * | 7/2012 | Molnar | G06T 9/00 345/581 |
| 2005/0275657 A1 * | 12/2005 | Hutchins | G06T 11/40 345/506 |
| 2010/0302246 A1 | 12/2010 | Jiao et al. | |
| 2012/0223946 A1 | 9/2012 | Nystad et al. | |
| 2014/0002458 A1 * | 1/2014 | Angelidis | G06T 15/005 345/426 |
| 2014/0362101 A1 | 12/2014 | Cerny et al. | |
| 2015/0070355 A1 * | 3/2015 | Clarberg | G06T 15/005 345/426 |

(Continued)

OTHER PUBLICATIONS

Vaidyanathan et al., "Coarse Pixel Shading," High Performance Graphics, Intel Corporation, Lund University, The Eurographics Association, 2014, 10 pp.

(Continued)

*Primary Examiner* — Phi Hoang
(74) *Attorney, Agent, or Firm* — Shumaker & Sieffert, P.A.

(57) ABSTRACT

A graphics processing unit (GPU) may rasterize a primitive into a plurality of samples, wherein vertices of the primitive are associated with VRS parameters. The GPU may determine a VRS quality group that comprises one or more sub regions of the plurality of samples based at least in part on the VRS parameters. The GPU may fragment shade a VRS tile that represents the VRS quality group, wherein the VRS tile comprises fewer samples than the VRS quality group. The GPU may amplify the stored VRS tile into shaded fragments that correspond to the VRS quality group.

26 Claims, 10 Drawing Sheets

(56) References Cited

U.S. PATENT DOCUMENTS

| | | |
|---|---|---|
| 2015/0170345 A1 | 6/2015 | Vaidyanathan et al. |
| 2016/0048999 A1* | 2/2016 | Patney .................... G06T 15/80 345/426 |
| 2016/0049000 A1 | 2/2016 | Patney et al. |
| 2016/0078665 A1 | 3/2016 | Kwon et al. |

OTHER PUBLICATIONS

International Search Report and Written Opinion of International Application No. PCT/US2017/018438, dated Apr. 25, 2017, 15 pp.

He et al., "Extending the Graphics Pipeline with Adaptive, Multi-Rate Shading", ACM Transactions on Graphics, vol. 33, No. 4, Article 142, Publication Date: Jul. 2014, 12 pp.

Fatahalian et al., "Reducing Shading on GPUs using Quad-Fragment Merging", ACM Transactions on Graphics, vol. 29, No. 4, Article 67, Publication date: Jul. 2010, 8 pp.

\* cited by examiner

PER-VERTEX VARIABLE RATE SHADING

This application claims priority to U.S. Provisional Patent Application No. 62/320,362 filed Apr. 8, 2016, the entirety of which is incorporated by reference herein.

TECHNICAL FIELD

This disclosure relates to graphics processing systems, and more particularly, to graphics processing systems that utilize variable rate shading.

BACKGROUND

Computing devices often utilize a graphics processing unit (GPU) to accelerate the rendering of graphics data for display. Such computing devices may include, e.g., computer workstations, mobile phones such as so-called smartphones, embedded systems, personal computers, tablet computers, and video game consoles. GPUs typically execute a graphics processing pipeline that includes a plurality of processing stages which operate together to execute graphics processing commands. A host central processing unit (CPU) may control the operation of the GPU by issuing one or more graphics processing commands to the GPU.

SUMMARY

This disclosure is directed to high quality variable rate shading (VRS) by a graphics processing unit (GPU). VRS includes rendering different regions of an image at variable pixel densities or level of details (LODs) to reduce the amount of data that needs to be processed, while minimizing the visual effect on image quality of the rendered image.

In one aspect, a method of VRS comprises rasterizing, by a graphics processing unit (GPU), a primitive into a plurality of samples, wherein vertices of the primitive are associated with VRS parameters. The method further comprises determining, by the GPU, a VRS quality group that comprises one or more sub regions of the plurality of samples based at least in part on the VRS parameters. The method further comprises fragment shading, by the GPU, a VRS tile that represents the VRS quality group, wherein the VRS tile comprises fewer samples than the VRS quality group. The method further comprises amplifying, by the GPU, the fragment shaded VRS tile into stored samples that correspond to the VRS quality group.

In another aspect, a device for VRS comprises a memory. The device further comprises at least one processor operably coupled to the memory and configured to: rasterize a primitive into a plurality of samples, wherein vertices of the primitive are associated with VRS parameters; determine a VRS quality group that comprises one or more sub regions of the plurality of samples based at least in part on the VRS parameters; fragment shade a VRS tile that represents the VRS quality group, wherein the VRS tile comprises fewer samples than the VRS quality group; and amplify the fragment shaded VRS tile into stored samples that correspond to the VRS quality group.

In another aspect, an apparatus for VRS comprises means for rasterizing a primitive into a plurality of samples, wherein vertices of the primitive are associated with VRS parameters. The apparatus further comprises means for determining a VRS quality group that comprises one or more sub regions of the plurality of samples based at least in part on the VRS parameters. The apparatus further comprises means for fragment shading a VRS tile that represents the VRS quality group, wherein the VRS tile comprises fewer samples than the VRS quality group. The apparatus further comprises means for amplifying the fragment shaded VRS tile into stored samples that correspond to the VRS quality group.

In another aspect, a non-transitory computer readable storage medium stores instructions. The instructions, upon execution by one or more processors, cause the one or more processors to: rasterize a primitive into a plurality of samples, wherein vertices of the primitive are associated with VRS parameters; determine a VRS quality group that comprises one or more sub regions of the plurality of samples based at least in part on the VRS parameters; fragment shade a VRS tile that represents the VRS quality group, wherein the VRS tile comprises fewer samples than the VRS quality group; and amplify the fragment shaded VRS tile into stored samples that correspond to the VRS quality group.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
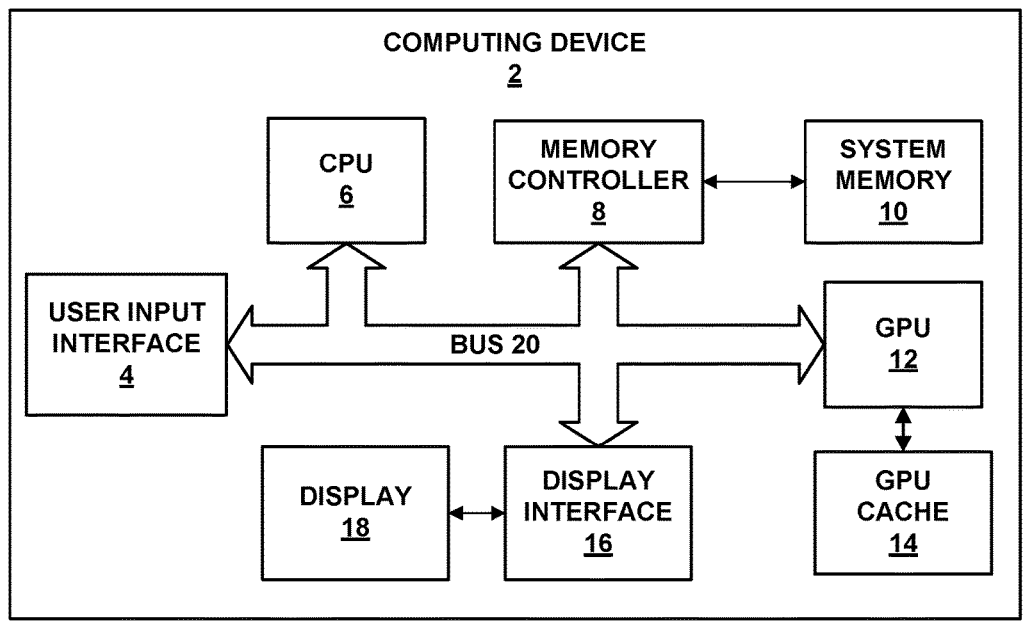
FIG. 1 is a block diagram illustrating an example computing device that may be used to implement the techniques of this disclosure.

This disclosure is directed to variable rate shading (VRS) techniques. Modern graphics applications may be heavily fragment shading bound (e.g., fragment shading requires a large amount of processing time), with the amount of fragment shading becoming a bigger issue as screen resolutions and desired frame rates continue to increase. VRS is a technique that aims to solve this problem by rendering different regions of an image at variable pixel densities or level of details (LODs), thereby enabling applications to run the fragment shader (also called a pixel shader) at a different resolution than the final rendering resolution for a scene. VRS has many potential use cases in graphics processing, including foveated rendering (such as used in head mounted displays for virtual reality applications) and advanced visual effects such as depth of field, motion blur, and soft shadow mapping.

In some examples, the techniques described in this disclosure may expose VRS functionality (e.g., graphics processing unit (GPU) hardware configured to perform VRS techniques) to software applications by adding additional states or parameters per vertex for a primitive that indicates the desired quality parameters for the primitive, and by interpolating these per-vertex states and/or parameters across the primitive made up of the vertices. In this way, the techniques described in this disclosure may provide an application with increased flexibility to specify different shading parameters for different regions of the scene, as well as for different objects.

In accordance with some aspects of the present disclosure, the techniques described in this disclosure may utilize multiple VRS quality groups (e.g., up to 8 or more VRS quality groups) to shade a single primitive, so that a GPU may be configured to shade different portions of a single primitive at different shading rates, thereby enabling the shading rate of the scene to change at relatively finer levels of granularity. Thus, the techniques described in this disclosure may overcome potential problems such as visual artifacts at edges of different pixel densities, large regions having to be rendered at identical LODs, overdraw, processing overhead, additional hardware cost, and the shading cost required to composite layers of different level of details. Further, because different primitives may be shaded at different rates, the techniques disclosed herein may enable overlapping objects to be rendered at different resolutions in the finally rendered scene.

In accordance with further aspects of the present disclosure, the techniques and apparatuses disclosed herein may result in relatively higher rendering quality because operations such as triangle hit testing, coverage, depth testing, and the like may in some cases always be rendered at the highest resolution because the techniques disclosed herein may enable an application to maintain access to other graphics hardware and hardware functions (e.g., stencil buffer, multisample anti-aliasing, etc.) while performing VRS according to the techniques in this disclosure. In addition, the techniques in this disclosure may potentially be implemented with much smaller hardware changes than other potential techniques and may work alongside multisample anti-aliasing (MSAA).

FIG. 1 is a block diagram illustrating an example computing device 2 that may be used to implement techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a GPU cache 14, a display interface 16, a display 18, and bus 20. User input interface 4, CPU 6, memory controller 8, GPU 12, and display interface 16 may communicate with each other using bus 20. Bus 20 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, Vulkan, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of system memory 10. For example, memory controller 8 may receive memory read and write commands, and service such commands with respect to memory 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store command streams for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics commands may include, e.g., drawing commands such as a draw call, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to GPU cache 14. Thus, GPU 12 may read data from and write data to GPU cache 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. GPU cache 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

CPU 6 and/or GPU 12 may store rendered image data in a frame buffer that is allocated within system memory 10. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computing device 2 via a wired or wireless communications link. For instance, display 18 may be a computer monitor or flat panel display connected to a personal computer via a cable or wireless link.

GPU 12, alone or in combination with CPU 6, may be configured to perform the example techniques described in this disclosure. As an example, GPU 12 may be configured to perform variable rate shading (VRS) in which case GPU 12 render different regions of an image at variable pixel densities or level of details (LODs). To perform VRS, an application running on CPU 6 or GPU 12 may direct GPU 12 to render a graphical scene, and may send, such as via a GPU Driver, information associated with a plurality of vertices making up the graphical scene to GPU 12. Specifically, an application may send VRS parameters for each vertex to be rendered to GPU 12.

GPU 12 may rasterize a primitive into a plurality of pixels, wherein vertices of the primitive are associated with VRS parameters. GPU 12 may represent one or more sub regions of the plurality of pixels as a pixel quad based at least in part on the VRS parameters. GPU 12 may fragment shade the pixel quad. GPU 12 may amplify the fragment shaded pixel quads into fragments that correspond to the one or more sub regions of the plurality of pixels.

GPU 12 may generate pixel representations of the shaded fragments and may write the generated pixel values to a frame buffer, such as by blending those pixel values with pixel values already in the frame buffer. In this way, GPU 12 may perform per-vertex VRS for a set of vertices.

Figure 2:
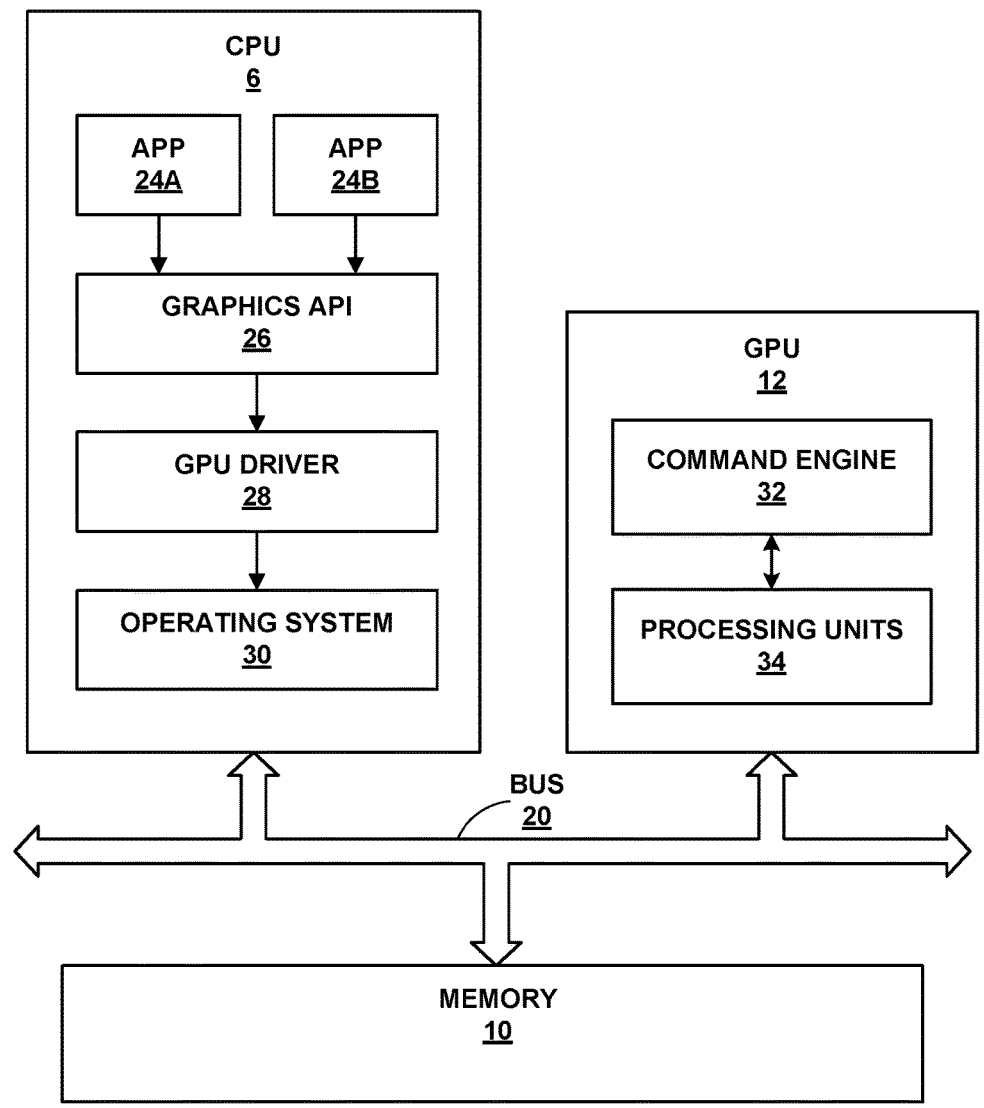
FIG. 2 is a block diagram illustrating the CPU, the GPU and the memory of the computing device of FIG. 1 in further detail.

FIG. 2 is a block diagram illustrating CPU 6, GPU 12 and memory 10 of computing device 2 of FIG. 1 in further detail. As shown in FIG. 2, CPU 6 is communicatively coupled to GPU 12 and memory 10 via bus 20, and GPU 12 is communicatively coupled to CPU 6 and memory 10 via bus 20. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC). CPU 6 is configured to execute software applications 24A, 24B, a graphics API 26, a GPU driver 28 and an operating system 30. GPU 12 includes a command engine 32 and one or more processing units 34.

Software applications 24A, 24B may each include at least one of one or more instructions that cause graphic content to be displayed or one or more instructions that cause a non-graphics task (e.g., a general-purpose computing task) to be performed on GPU 12. Software applications 24A, 24B may issue instructions to graphics API 26. Graphics API 26 may be a runtime service that translates the instructions received from software applications 24A, 24B into a format that is consumable by GPU driver 28.

GPU driver 28 receives the instructions from software applications 24A, 24B, via graphics API 26, and controls the operation of GPU 12 to service the instructions. For example, GPU driver 28 may formulate one or more command streams, place the command streams into memory 10, and instruct GPU 12 to execute command streams. GPU driver 28 may place the command streams into memory 10 and communicate with GPU 12 via operating system 30, e.g., via one or more system calls.

Command engine 32 is configured to retrieve the commands stored in the command streams, and dispatch the commands for execution on one or more of processing units 34. Command engine 32 may dispatch commands from a command stream for execution on all or a subset of processing units 34. Command engine 32 may be hardware of GPU 12, may be software or firmware executing on GPU 12, or a combination of both.

Processing units 34 may include one or more processing units, each of which may be a programmable processing unit (e.g., a shader processor or shader unit) or a fixed function processing unit. A programmable processing unit may include, for example, a programmable shader unit that is configured to execute one or more shader programs (e.g., the consuming shader described above) that are downloaded onto GPU 12 from CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, a programmable shader unit may include a plurality of processing units that are configured to operate in parallel, e.g., an SIMD pipeline. A programmable shader unit may have a program memory that stores shader program instructions and an execution state register, e.g., a program counter register that indicates the current instruction in the program memory being executed or the next instruction to be fetched. The programmable shader units in processing units 34 may include, for example, consuming shader units, vertex shader units, fragment shader units, geometry shader units, hull shader units, domain shader units, compute shader units, and/or unified shader units.

A fixed function processing unit may include hardware that is hard-wired to perform certain functions. Although the fixed function hardware may be configurable, via one or more control signals for example, to perform different functions, the fixed function hardware typically does not include a program memory that is capable of receiving user-compiled programs. In some examples, the fixed function processing units in processing units 34 may include, for example, processing units that perform raster operations, such as, e.g., depth testing, scissors testing, tessellation, alpha blending, etc.

Figure 3:
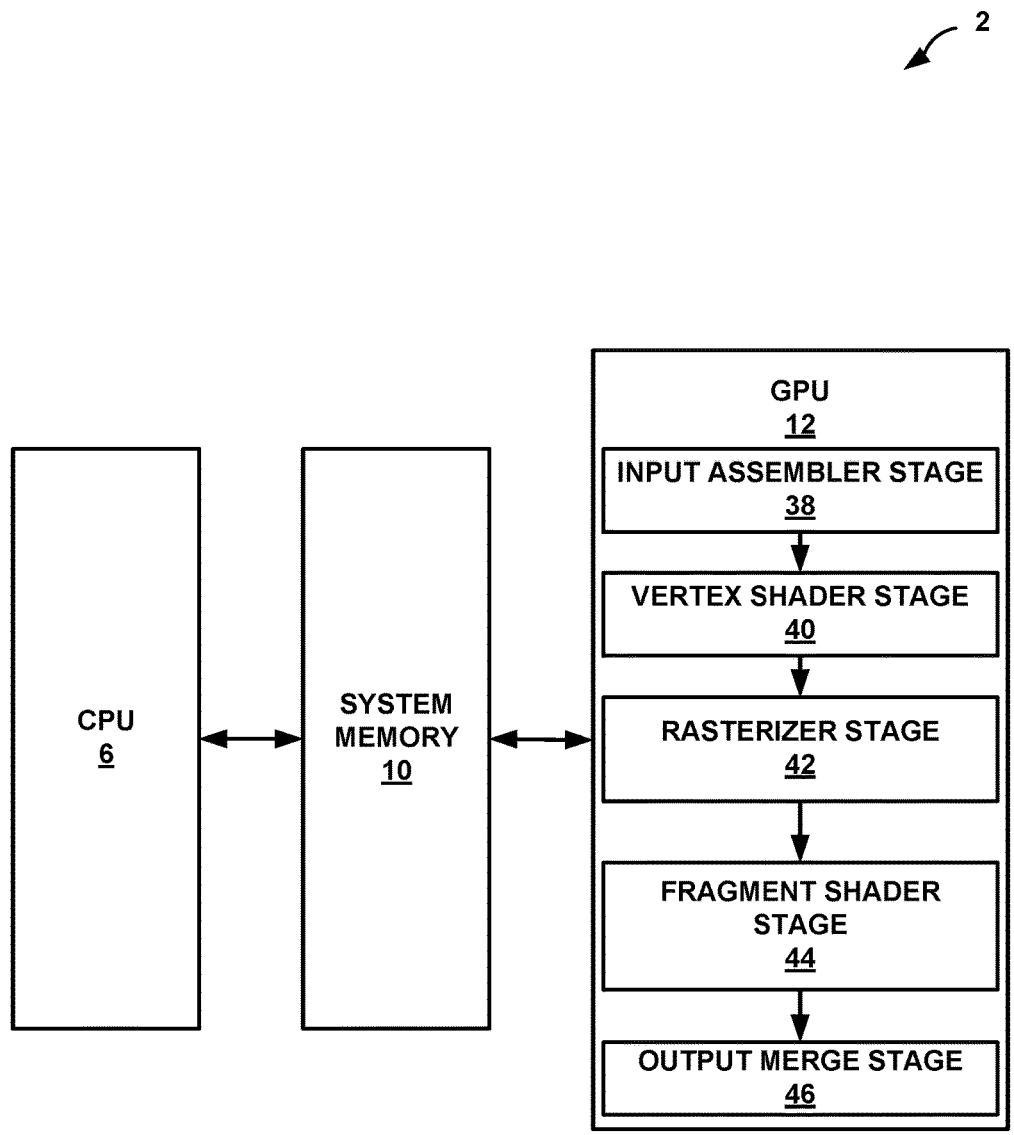
FIG. 3 is a block diagram illustrating an example of a graphics processing unit (GPU) that may implement an example of a graphics processing pipeline in accordance with one or more examples described in this disclosure.

FIG. 3 is a block diagram illustrating an example of GPU 12 that may implement an example of a graphics processing pipeline in accordance with one or more examples described in this disclosure. To perform graphics operations, GPU 12 may implement a graphics processing pipeline. The graphics processing pipeline includes performing functions as defined by software or firmware executing on GPU 12 and performing functions by fixed-function units that are hard-wired to perform very specific functions. The software or firmware executing on the GPU 12 may be referred to as shaders, and the shaders may execute on one or more shader processors of GPU 12 (e.g., a vertex shader executing vertex shader stage 40 and/or a fragment shader executing fragment shader stage 44). Shaders provide users with functional flexibility because a user can design the shaders to perform desired tasks in any conceivable manner. The fixed-function units, however, are hardwired for the manner in which the fixed-function units perform tasks. Accordingly, the fixed-function units may not provide much functional flexibility.

In this example, GPU 12 may include one or more of input assembler stage 38, vertex shader stage 40, rasterizer stage 42, fragment shader stage 44, and output merge stage 46. GPU 12 may include addition stages such a hull shader stage, tessellation stage, domain shader stage that following the vertex shader stage in that order. GPU 12 may also include a geometry shader stage that is coupled to the output to domain shader stage, if GPU includes a domain shader stage, or the output of the vertex shader stage 40, if no domain shader stage. Rasterizer stage 42 may receive graphics data from vertex shader stage 40, as illustrated, or from geometry shader stage (when available) or domain shader stage (when available).

GPU 12 may also include additional shader stages such as specific shader stages (e.g., consuming shader stage) to perform the example techniques described in this disclosure. In general, the various components in the graphics pipeline may together perform the example techniques.

Other configurations of the graphics pipeline are possible, and the techniques descried in this disclosure should not be considered limited to the specific example illustrated in FIG. 3. For example, GPU 12 may include more stages than those illustrated, and in some examples, GPU 12 may not necessarily include all of the illustrated stages. Also, the specific ordering of the stages is provided for purposes of illustration and should not be considered limiting.

Input assembler stage 38 may read vertex points of vertices from system memory 10 as defined by CPU 6, and assemble the control points to form the vertices. For instance, input assembler stage 38 may read the coordinates, color values, and other such information. The coordinates, color values, and other such information may be commonly referred to as attributes of the vertices. Based on the attributes of the vertices, input assembler stage 38 may determine the general layout of the primitives. In this manner, input assembler stage 38 may assemble the control points to form the patch. Input assembler stage 38 may be a fixed-function unit.

Vertex shader stage 40 may process the vertices from input assembler stage 38. For example, vertex shader stage 40 may perform per-vertex operations such as transformations, skinning, morphing, and per-vertex lighting. Vertex shader stage 40 may be a shader program that is executed by shader processors.

Rasterizer stage 42 receives the primitives from a geometry shader stage and converts the primitives into pixels for the display. For example, the primitives may be defined as vectors that indicate the interconnection of the primitives, and may be defined in a coordinate space that is independent of the display on which the image is to be displayed. Rasterizer stage 42 converts these vectors into the display coordinates, and performs any additional functions such as removing points within primitives that are occluded.

In accordance with aspects of the present disclosure, GPU 12 may execute rasterizer stage 42 to perform at least a portion of the variable rate shading techniques disclosed herein. For example, GPU 12 may execute rasterizer stage 42 to rasterize a primitive and to determine one or more VRS quality groups associated with the primitive, and may generate a VRS tile for each of the VRS quality groups for the primitive.

In some examples, GPU 12 may delay execution of rasterizer stage 42 for non-edge portions of primitives. GPU 12 may execute rasterizer stage 42 to perform the variable rate shading techniques disclosed herein on the edge portions of primitives (e.g., edges of triangle primitives) while delaying execution of rasterizer stage 42 for non-edge portions of primitives (e.g., center portions of triangle primitives). In this way, GPU 12 may, at a later point after executing rasterizer stage 42 to perform variable rate shading for edge portions of primitives, execute rasterizer stage 42 to perform rasterization for those non-edge portions of primitives at a later point in the graphics processing pipeline rather than the variable rate shading techniques disclosed herein.

In some examples, GPU 12 may include an additional functional unit or other hardware that may dynamically determine the granularity of the rasterization of primitives. The additional functional unit may, for example, direct GPU 12 to execute rasterizer stage 42 to perform the variable rate shading techniques disclosed herein on the edge portions of primitives (e.g., edges of triangle primitives) while directing GPU 12 to execute rasterizer stage 42 to perform other forms of rasterization on non-edge portions of primitives (e.g., center portions of triangle primitives).

Fragment shader stage 44 (sometimes referred to as a pixel shader stage) receives the pixels as outputted by rasterizer stage 42 and performs post processing to assign color values to each of the pixels that are to be displayed. For example, fragment shader stage 44 may receive constant values stored in system memory 10, texture data stored in system memory 10, and any other data to generate per-pixel outputs such as color values. Fragment shader stage 44 may also output opacity values that indicate the opaqueness of the pixels.

In accordance with aspects of the present disclosure, GPU 12 may execute fragment shader stage 44 to perform at least a portion of the variable rate shading techniques disclosed herein. For example, GPU 12 may execute fragment shader stage 44 to fragment shade the VRS tiles generated by GPU 12 during performance of the rasterizer stage 42.

Output merge stage 46 may perform any final pixel processing. For example, output merge stage 46 may utilize depth information to further determine whether any of the pixels should be removed from being displayed. Output merge stage 46 may also perform blending operations to generate final pixel values. Output merge stage 46 may output the final pixel values to a frame buffer, generally located within system memory 10, but which may be located within GPU 12.

Figure 4A:
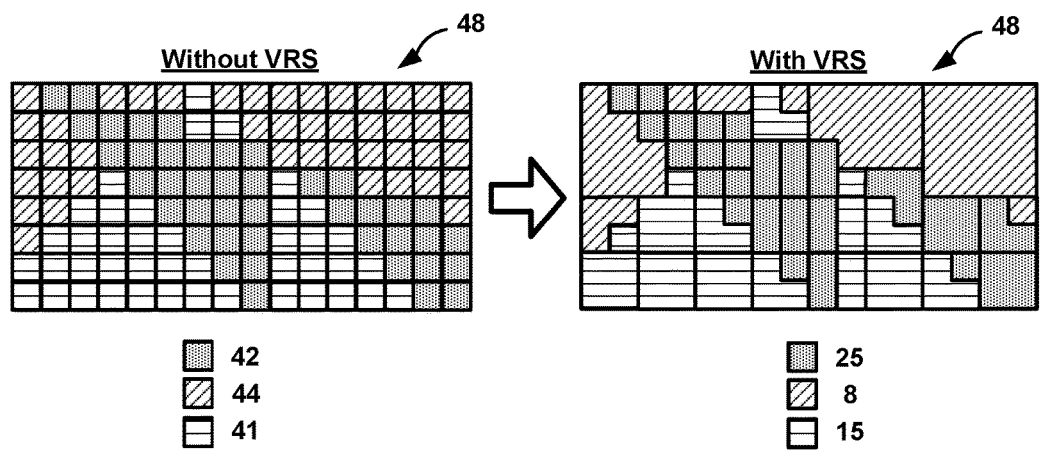
FIG. 4A is a conceptual diagram illustrating use of VRS to control the fragment shading resolution of primitives.

As described, GPU 12 may perform one or more stages of the graphics processing pipeline illustrated in FIG. 3 to perform VRS on primitives, in order to control the fragment shading resolution of the primitives. FIG. 4A is a conceptual diagram illustrating use of VRS to control the fragment shading resolution of primitives. As shown in FIG. 4A, without VRS, GPU 12 may generate a fragment (e.g., via rasterization) for each pixel within the portion of primitive 48 shown in FIG. 4A. Because the portion of primitive 48 shown in FIG. 4A includes 127 samples, GPU 12 may fragment shade 127 fragments.

Conversely, with VRS, GPU 12 may be control the fragment shading resolution within the portion of primitive 48 shown in FIG. 4A at a per-pixel level. Thus, the number of pixels represented by a fragment may change across the portion of primitive 48 shown in FIG. 4A, from representing a single pixel to representing multiple pixel. Thus, in the example of FIG. 4A, GPU 12 may, with the use of VRS, generate 46 fragments to represent the 127 pixels included within the portion of primitive 48 shown in FIG. 4A. In addition, not only can the fragment shading resolution change within a single primitive, GPU 12 may control the fragment shading resolution of overlapping primitives via VRS such that overlapping primitives may have different fragment shading resolutions.

Figure 4B:
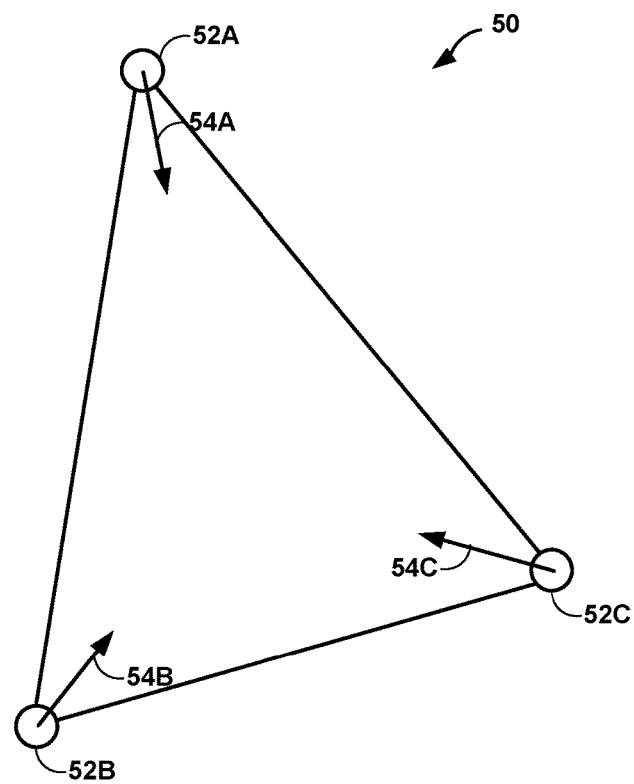
FIG. 4B illustrates an example primitive made up of vertices.

GPU 12 may specify the fragment shading resolutions within a primitive by specifying a set of VRS parameters for the primitive. FIG. 4B illustrates an example primitive 50 made up of vertices 52A-52C (hereafter "vertices 52"). As discussed above, a software application executing on CPU 6 or GPU 12 may communicate indications of vertices 52 to GPU 12 to be rendered in a scene, along with a set of VRS parameters 54A-54C (hereafter "VRS parameters 54").

GPU 12 may define VRS parameters 54 for vertices 52 of primitive 50 in vertex shader stage 40 and pass VRS parameters 54 from vertex shader stage 40 to rasterizer stage 42. In one example, software application 24A and/or software application 24B may define the particular VRS parameters 54 in vertex shader stage 40 so that vertex shader stage 40 may pass VRS parameters 54 to rasterizer stage 42. Vertex shader stage 40 may pass VRS parameters 54 via varying variables that may carry per-vertex values for vertices of a primitive. Because VRS parameters 54 are set in vertex shader stage 40, the techniques disclosed herein may be a very programmable single pass process. Further, setting VRS parameters 54 in vertex shader stage 40 may enable software application 24A and/or software application 24B to directly control the fragment shading workload of GPU 12 from vertex shader stage 40.

GPU 12 may define VRS parameters 54 in a per-vertex fashion, so that GPU 12 may associate each vertex of vertices 52 a VRS parameter of VRS parameters 54. In one example, VRS parameters 54 may each be a vector defined by $<vrs_x, vrs_y, vrs_z, vrs_w>$ components, where $vrs_x$, $vrs_y$, and $vrs_z$ may denote the vector components of the vector in three-dimensional space, and where $vrs_w$ may be a quality parameter. The quality parameter $vrs_w$ may correlate with or otherwise indicate the level of detail at which GPU 12 may render representations of the vertex in the finally rendered scene. In some examples, the direction and magnitude of the vector may also be associated with the desired falloffs and changes in shading resolution across primitive 50. In other examples, w, y, z, and w may denote any other suitable parameters and/or positions associated with the vertex.

The VRS parameters 54 may define the fragment sampling resolution of primitive 50 when VRS parameters 54 are interpolated (e.g., barycentrically interpolated) across primitive 50. In other words, GPU 12 may use VRS parameters 54 to control the fragment shading resolution of primitive 50, and may interpolate VRS parameters 54 to vary the fragment shading resolution across primitive 50. The fragment sampling resolution may be the number of pixels that may be represented by a single fragment.

VRS parameters 54 may support a variety of falloffs in the fragment shading resolution of primitive 50. Falloffs in the fragment resolution of primitive 50 may be changes in the fragment shading resolution within primitive 50. Some examples of falloffs supported by VRS parameters 54 may include flat falloff, linear falloff, planar falloff, cylindrical falloff, barycentric falloff, polar falloff, ellipsoid falloff, $2^{nd}$ order Taylor approximation falloff, and the like. In some examples, VRS parameters 54 may also utilize a configurable falloff ramp from, for example, full resolution to 1/128 resolution for additional flexibility.

As discussed above, vertex shader stage 40 may perform vertex shading operations on input vertices of primitives (e.g., primitive 50) to result in output vertices (e.g., vertices 52) These output vertices, as a result of performing vertex shading, may each have a position in both clip space and in VRS space, which are distinct spaces. For example, the position of a vertex in clip space may be $<pos_x, pos_y, pos_z, pos_w>$ while the position of the vertex in VRS space may be $<vrs_x, vrs_y, vrs_z, vrs_w>$. GPU 12 may map the coordinates of a point in one space to the corresponding coordinates of the other space via barycentric interpolation. In other words, the corresponding coordinates of a point in one space can be found by barycentrically interpolating the coordinates of the other space. Thus, for example, GPU 12 may barycentrically interpolate coordinates in clip space to map to corresponding coordinates in VRS space, and vice versa.

GPU 12 may convert clip space coordinates of a vertex into Normalized Device Coordinates by dividing each of $pos_x$, $pos_y$, and $pos_z$, by $pos_w$. Similarly, GPU may convert VRS space coordinates of a vertex into Normalized VRS Coordinates by dividing each of $vrs_x$, $vrs_y$, and $vrs_z$ by $vrs_w$. Further, GPU 12 may map the coordinates of a point in Normalized Device Coordinates to the corresponding coordinates of the point in Normalized VRS Coordinates by perspective interpolating the VRS positions in Normalized Device coordinates. The distance of a point in Normalized VRS coordinates from the origin may control the fragment shading resolution through a ramp function. Specifically, the ramp function controls how the fragment shading resolution scales with distance from the origin in Normalized VRS coordinates. For example, given a simple foveation falloff of VRS_Layer=log 2(length(NVRS.xyz)+c)*2, where VRS_Layer indicates the fragment shading resolution of a point NVRS.xyz in Normalized VRS coordinates, the equivalent ramp function may be VRS_Layer=ramp (NVRS.x^2+NVRS.y^2+NVRS.z^2).

Thus, if an entire primitive is rendered at the same fragment shading resolution, the fragment is reduced into a single point in Normalized VRS coordinates. If the fragment shading resolution of a fragment follows a planar or barycentric falloff, the primitive may be reduced into a line in Normalized VRS coordinates. In foveated rendering with depth of field, the focal point may be at the origin in Normalized VRS coordinates and the falloff for a primitive may be circular in Normalized VRS coordinates.

In some examples, GPU 12 may interpolate VRS parameters 54 across primitive 50, such as via barycentric interpolation, to vary the shading resolution across primitive 50. In one example, a particular VRS parameter of VRS parameters 54 may specify the number of samples per fragment as $\max(1, vrs_x^2+vrs_y^2+vrs_z^2+vrs_w)$. In this equation, $vrs_w$ is not squared to allow for planar, linear, and barycentric falloff. In other examples, GPU 12 may interpolate VRS parameters 54 to specify the number of pixels per fragment across primitive 50 in any other suitable manner. For example, GPU 12 may utilize any other suitable equation or equations to interpolate VRS parameters 54 to specify the number of pixel per fragment across primitive 50.

Software application 24A and/or software application 24B may define VRS parameters 54 in a number of different ways. For example, if GPU 12 performs shading with an average pixel distance ($D_{avg}$), software application 24A and/or software application 24B may generate VRS parameters 54 each having components $<(D_{avg}, 0, 0, 0>$. If GPU 12 performs shading with an average frequency ($f_{avg}$), software application 24A and/or software application 24B may generate VRS parameters 54 each having components $<0, 0, 0, 1/f_{avg}>$. If GPU 12 performs foveated rendering with focal components $<f_x, f_y>$ and gain $<g_x, g_y>$, software application 24A and/or software application 24B may generate VRS parameters 54 each having components $<(f_x-gl_{position.x})*g_x, (f_y-gl_{position.y})*g_y, 0, 0>$, where $gl_{position.x}$ and $gl_{position.y}$ may be the x and y coordinates of the position of the associated vertex. If GPU 12 performs depth of field rendering with focal fz and gain gz, software application 24A and/or software application 24B may generate VRS parameters 54 each having components $<0, 0, (fz-gl_{position.z})*gz, 0>$, where $gl_{position.z}$ may be the z coordinate of the position of the associated vertex. If GPU 12 performs a $2^{nd}$ order Taylor expansion $a*x^2+b*x+c$, software application 24A and/or software application 24B may generate VRS parameters 54 each having components $<sqrt(a)*x, sqrt(c), 0, and b*x)$.

Figure 5A:
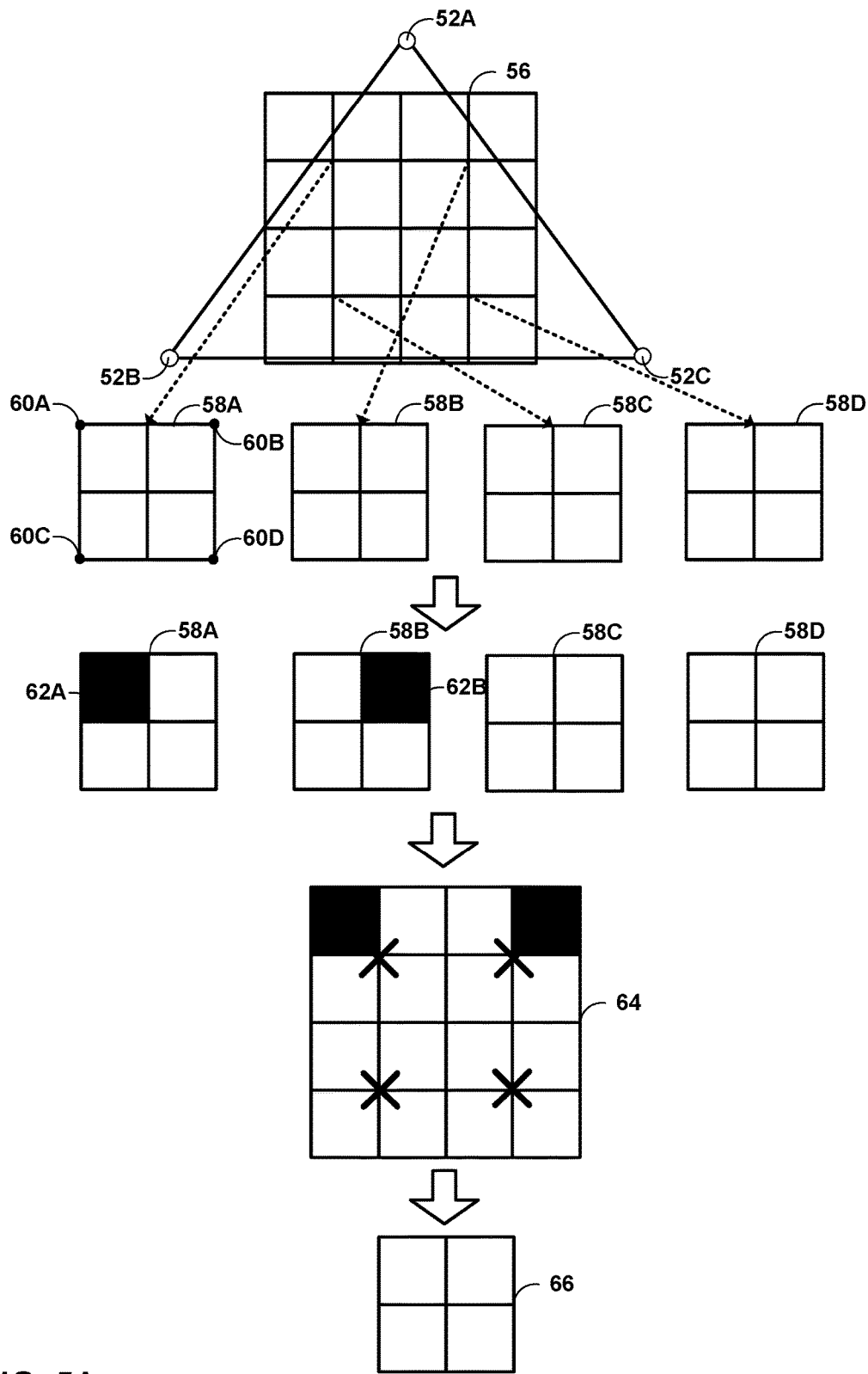
FIGS. 5A-5B illustrate variable rate shading that may be performed for a primitive based on the VRS parameters associated with the vertices of the primitive.
Figure 5B:
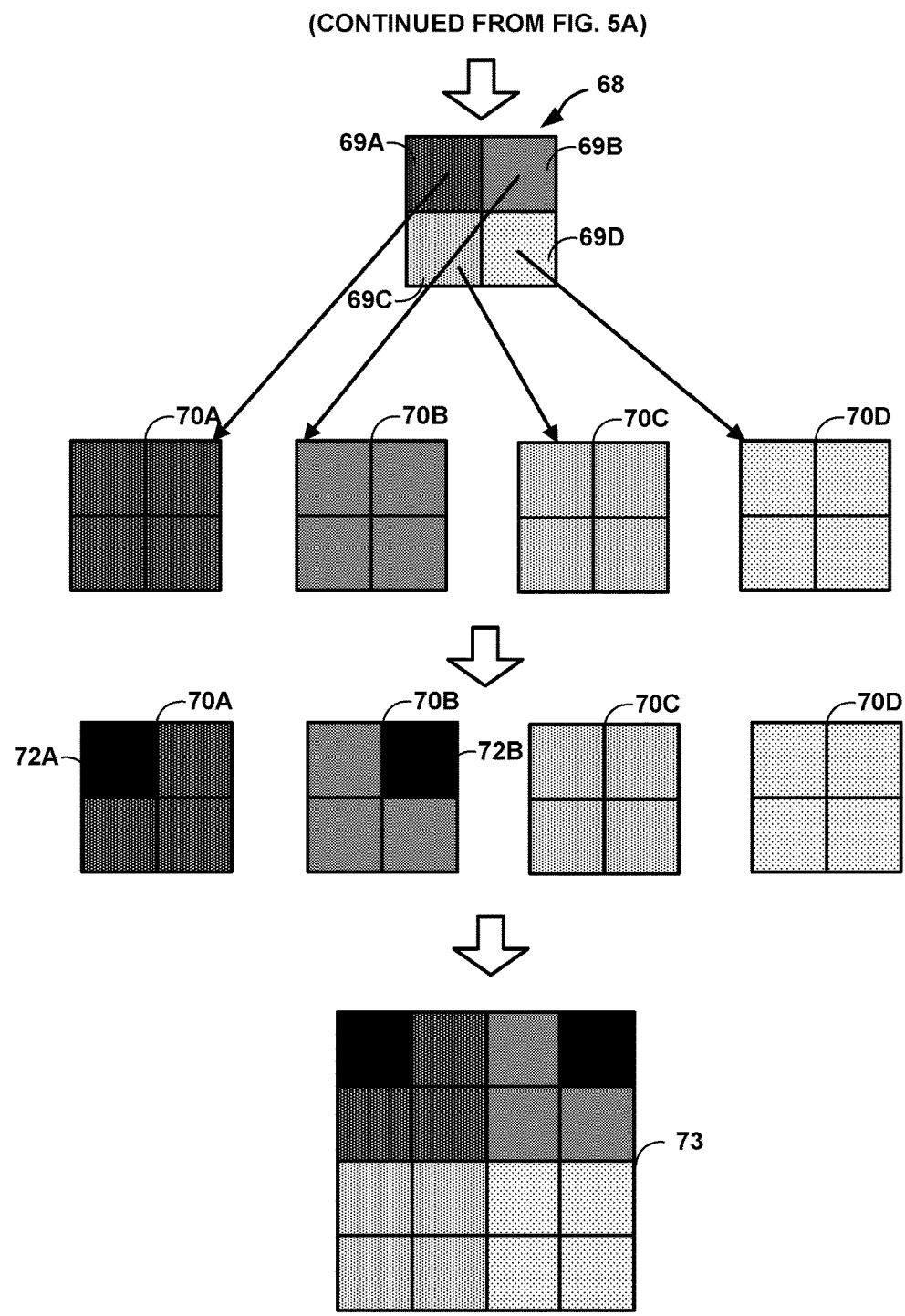

FIGS. 5A-5B illustrate variable rate shading that may be performed for a primitive based on the VRS parameters associated with the vertices of the primitive. As shown in FIG. 5A, GPU 12 may, for a primitive (e.g., primitive 50), perform rasterizer stage 42 to generate samples that represent primitive 50. A sample may refer to the granularity of rasterizer stage 42 and may define the amount of storage per pixel. In non-MSAA rendering, a single sample represents a single pixel. Thus, in FIGS. 5A-5B, samples may represent pixels that correspond to primitive 50.

GPU 12 may determine the shading rate of at least a portion of the samples that represent primitive 50 based on VRS parameters 54 associated with vertices 52 of primitive 50. Specifically, GPU 12 may subdivide the rasterized samples that represent primitive 50 into one or more portions of samples, and may determine an associated VRS quality value for each of the portion of samples based at least in part on VRS parameters 54 associated with vertices 52 of primitive 50. In the example of FIG. 5A, samples 56 may be one of the one or more portions of the samples that represent primitive 50 (e.g., samples 56 may be a subset of the samples that represent primitive 50).

The shading rate may indicate the level of detail at which GPU 12 performs fragment shading of the samples within primitive 50, where a relatively high shading rate may correspond to a high level of detail, and a relatively low shading rate may correspond to a low level of detail. By determining an associated VRS quality value for each of one or more sub-portions of the samples that represent primitive 50, GPU 12 may determine whether two or more of the sub-portions of samples have similar VRS quality values, and, if so, may perform fragment shading of these two or more sub-portions of samples at the same shading rate.

In one example, GPU 12 may determine the shading rate of samples representing primitive 50 by interpolating VRS parameters 54 across primitive 50 to determine the number of samples represented by a single sample for the purposes of performing fragment shading. A high shading rate may correspond to relatively fewer numbers of samples represented by a single sample for the purposes of fragment shading, while a low shading rate may correspond to relatively higher numbers of samples represented by a single sample for the purposes of fragment shading.

FIG. 5A illustrates samples 56 as comprising a plurality of quads 58A-58D ("quads 58"). Samples 56 may also comprise any other suitable rectangular grouping of samples, such as 1×2 groups of samples, 4×8 groups of samples, 4×4 groups of samples, and the like. As such, the techniques described herein for VRS of samples 56 in terms of quads may be equally applicable for VRS of any other suitable groupings of samples 56.

Quads 58 may, in some instances, be referred to as depth quads because GPU 12 may be able to perform per-sample processing of quads 58, such as depth testing, coverage testing, and the like. Thus, prior to compressing quads 58 into a single quad on which GPU 12 may perform fragment shader stage 44, GPU 12 may perform per-sample processing of quads 58. Specifically, GPU 12 may perform, for example, per-sample coverage testing on the samples of quads 58 to determine whether each sample of quads 58 is located inside primitive 50, and may generate a coverage mask that indicates one or more samples (if any) of quads 58 are not located inside primitive 50. In the example of FIG. 5A, GPU 12 may, based on performing the per-sample coverage testing, determine that samples 62A and 62B are not located inside primitive 50, and may generate a coverage mask that indicates that samples 62A and 62B are not located inside primitive 50.

Thus, the variable rate shading techniques disclosed herein may provide the potential technical advantage of a high overall render quality of images that are produced via the variable rate shading techniques disclosed herein because fixed function operations of GPU 12, such as coverage testing, may be performed at full resolution (i.e., per-sample or per-fragment), in contrast to other possible variable rate shading techniques which are not able to perform these fixed function operations at full (i.e., per-sample or per-fragment) resolution.

GPU 12 may determine level of detail at which samples 56 are fragment shaded based at least in part on determining a VRS quality value for each of the sub regions of samples 56 based at least in part on VRS parameters 54 of vertices 52. For each sub region of samples 56, GPU 12 may interpolate VRS parameters 54 of vertices 52 to the corners of the sub portion of samples 56 to determine interpolated VRS parameters for the sub region, and may determine a VRS quality value for the particular sub region of samples 56 based at least in part on the interpolated VRS parameters. If a sub region of samples 56 comprise a rectangular grouping of samples, GPU 12 may interpolate VRS parameters 54 to the corners of the sub region of samples 56 to generate four interpolated VRS parameters that are associated with the four corners of the sub region of samples 56, so that each corner of a sub region of samples 56 may be associated with a respective interpolated VRS parameter having components in the form of $<x, y, z, w>$.

In the example of FIG. 5A, where sub portions of samples 56 comprises quads 58, and taking quad 58A as a representative example of each of quads 58, quad 58A may have four corners 60A-60D ("corners 60"). GPU 12 may interpolate VRS parameters 54 of vertices 52 to each of corners 60 of quad 58A via any suitable interpolation method, such as barycentric interpolation, so that each corner of corners 60 of quad 58A may be associated with a respective interpolated VRS parameter having components in the form of $<x, y, z, w>$. Thus, in this example, corner 60A may be associated with interpolated VRS parameter $<x_1, y_1, z_1, w_1>$, corner 60B may be associated with interpolated VRS parameter $<x_2, y_2, z_2, w_2>$, corner 60C may be associated with interpolated VRS parameter $<x_3, y_3, z_3, w_3>$, and corner 60D may be associated with interpolated VRS parameter $<x_4, y_4, z_4, w_4>$.

GPU 12 may determine a minimum interpolated VRS parameter for each of quads 58 based at least in part on the interpolated VRS parameters of each of the respective quads 58. Once again, taking quad 58A as a representative example of each of quads 58, GPU 12 may determine the x, y, and z components of the minimum interpolated VRS parameter of quad 58A to be the minimum magnitude of the respective x, y, and z components of the interpolated VRS parameters associated with corners 60 of quad 58, and may determine the w component of the minimum interpolated VRS parameter of quad 58A to be the minimum of the respective w components of the interpolated VRS parameters associated with corners 60 of quad 58, as follows:

$x = \text{mag\_min}(x_1, x_2, x_3, x_4)$ if all signs are the same, else $x = 0$ $y = \text{mag\_min}(y_1, y_2, y_3, y_4)$ if all signs are the same, else $y = 0$ $z = \text{mag\_min}(z_1, z_2, z_3, z_4)$ if all signs are the same, else $z = 0$ $w = \min(w_1, w_2, w_3, w_4)$ In other words, GPU 12 may determine the values of the x, y, and z components of the minimum interpolated VRS parameter for quad 58A to be the minimum magnitude of the x, y, and z components of the interpolated VRS parameters associated with corners 60 as long as all the signs are the same, and may determine the value of the w component of the minimum interpolated VRS parameter for quad 58 to be the minimum value of the w component of the interpolated VRS parameters associated with corners 60.

GPU 12 may, for each respective quad of quad 58, determine a VRS quality value based at least in part on the associated minimum interpolated VRS parameter of the respective quad of quad 58. GPU 12 may determine these VRS quality values to determine one or more VRS quality groups for samples 56 of primitive 50, where a VRS quality group may be a region of uniform shading density (i.e., shading rate), and where a higher VRS quality value may denote a lower shading density (i.e., lower shading rate).

Taking quad 58A as a representative example of each of quads 58, GPU 12 may determine a VRS quality value for quad 58A based at least in part on applying a ramp function to the components of the associated minimum interpolated VRS parameter as follows: $\text{vrs\_quality\_value} = f_{ramp}(x^2 + y^2 + z^2 + w)$, where $<x, y, z, w>$ comprise the components of the minimum interpolated VRS parameter for quad 58A. In this equation, the w component of the minimum interpolated VRS parameter may not be squared to allow for planar, linear, and barycentric fall off.

One example of a ramp function used to calculate a VRS quality value for a quad (e.g., quad 58A) is as follows:

```
int get_vrs_quality(half x, half y, half z, half w) {
    half val = x*x+y*y+z*z+w;
    if (val < quality0_max)
        return 0;
    else if (val < quality1_max)
        return 1;
    else if (val < quality2_max)
        return 1;
    else if (val < quality3_max)
        return 2;
    else if (val < quality4_max)
        return 3;
```

```
        else if (val < quality4_max)
            return 5;
        else if (val < quality5_max)
            return 6;
        else
            return 7;
}
```

In this example, the VRS quality value for a quad may range from 0 to 7. Thus, GPU 12 may divide sub portions of samples 56 representing primitive 50 into up to 8 different VRS quality groups. GPU 12 may take as input parameters the components <x, y, z, w> of the minimum interpolated VRS parameter for a sub portion of samples 56 (e.g., quad 58A), and may calculate an intermediate value from the components <x, y, z, w> of the minimum interpolated VRS parameter as $x^2+y^2+z^2+w$. GPU 12 may apply a ramp function to the intermediate value to determine the VRS quality value for the quad based on where the intermediate value falls within a range of values.

GPU 12 may determine a set of maximum VRS quality values (e.g., from quality0_max to quality5_max). If the intermediate value falls below the value for quality0_max, GPU 12 may assign a corresponding VRS quality value of 0. If the intermediate value falls between the values for quality0_max and quality1_max, GPU 12 may assign a corresponding VRS quality value of 1. If the intermediate value falls between the values for quality1_max and quality2_max, GPU 12 may assign a corresponding VRS quality value of 2. If the intermediate value falls between the values for quality2_max and quality3_max, GPU 12 may assign a corresponding VRS quality value of 3. If the intermediate value falls between the values for quality3_max and quality4_max, GPU 12 may assign a corresponding VRS quality value of 4. If the intermediate value falls between the values for quality4_max and quality5_max, GPU 12 may assign a corresponding VRS quality value of 5. If the intermediate value falls between the values for quality5_max and quality6_max, GPU 12 may assign a corresponding VRS quality value of 6. If the intermediate value is above the value for quality6_max, GPU 12 may assign a corresponding VRS quality value of 7. Thus, in the example of FIG. 5A, GPU 12 may assign a VRS quality value between 0 and 7 for each of quads 58.

GPU 12 may define the values of the maximum quality values to increase the number of sub regions for which GPU 12 returns the same VRS quality value. Because GPU 12 may combine sub regions of the same VRS quality value into a VRS quality group having a particular shading density, GPU 12 may combine relatively more sub regions into the same VRS quality group to ensure high compressor efficiency for GPU 12.

GPU 12 may group sub regions of samples 56 into one or more VRS quality groups based at least in part on the VRS quality values as determined above. A VRS quality group may support a specified number of groupings of one or more sub regions of samples 56. In the example of FIG. 5A, where sub regions of samples 56 comprise quads (e.g., quads 58), a VRS quality group may comprise a single quad, a 2×1 grouping of quads, a 2×2 grouping of quads, a 4×2 grouping of quads, up to a 16×8 grouping of quads. Thus, a single VRS quality group may comprise anywhere between 1 to 128 sample quads. Because a single VRS tile is issued to represent a single VRS quality group for fragment shading, the fragment sampling workload of GPU 12 may be directly controlled by adjusting the VRS quality group that is used by a sample quad (e.g., one of quad 58).

Each of these different VRS quality groups may be associated with a different VRS quality value, such as VRS quality values ranging from 0 to 7 as described above, where larger groupings of quads may be associated with a greater VRS quality value. For example, a VRS quality group comprising a single quad may have an associated VRS quality value of 0, while a VRS quality group comprising a 16×8 grouping of quads may have an associated VRS quality value of 7.

GPU 12 may determine that a sub region of samples 56 (e.g., one of the quads 58) is compatible with a VRS quality group if it occupies the same spatial location as the VRS quality group and if the VRS quality value of the sub region is equal to or larger than the VRS quality value of the VRS quality group. For example, GPU 12 may attempt to overlay a VRS quality group comprising a specific grouping of sub regions over samples 56, and determine if each of the sub regions of samples 56 occupying the same spatial location as the overlay of the VRS quality group has an associated VRS quality value that is equal to or larger than the VRS quality value of the VRS quality group. If so, then GPU 12 may combine those sub regions of samples 56 into the particular VRS quality group.

Further, GPU 12 may combine samples into multiple VRS quality groups. For example, if a set of rasterized samples for a particular primitive comprises an 4×8 grouping of quads, GPU 12 may group the quads into a first VRS quality group comprising a grouping of 4×4 quads, a second VRS quality group comprising a grouping of 2×2 quads, and a third VRS quality group comprising a grouping of 2×2 quads. In some examples, GPU 12 may attempt to group sub regions of samples into the fewest VRS quality groups possible, according to the rules laid out above with regards to the grouping of sub regions of samples into VRS quality groups, thereby enabling the GPU 12 to more efficiently perform fragment shading of these samples.

In the example of FIG. 5A, GPU 12 may determine, based on the VRS quality value associated with each of quads 58, that it may combine quads 58 into a single VRS quality group 64. GPU 12 may generate a single VRS tile to represent a VRS quality group, where the VRS tile generated by GPU 12 includes fewer samples than the VRS quality group. In other words, to achieve variable rate shading, GPU 12 may compress the samples within a VRS quality group into a VRS tile comprising relatively fewer samples, and may shade the compressed samples in order to shade the samples in the VRS quality group. As shown in FIG. 5A, GPU 12 may compress VRS quality group 64 comprising 4×4 sample quads (64 samples) into a single sample quad as VRS tile 66. Thus, instead of performing fragment shader stage 44 to shade individual samples of quads 58, GPU 12 may instead perform fragment shader stage 44 to fragment shade the four samples making up VRS tile 66.

As shown in FIG. 5B, by performing fragment shader stage 44 to shade VRS tile 66 and to result in fragment shaded VRS tile 68, which may be a quad of fragment shaded samples, GPU 12 may generate a set of values associated with each sample of fragment shaded VRS tile 68. The set of values may include one or more of a depth value, a stencil value, and one or more color values. GPU 12 may amplify the set of values associated with each sample of fragment shaded VRS tile 68 into shaded fragments that correspond to the VRS quality group in order to, in effect perform fragment shading on all of the samples in VRS quality group 64.

Because each fragment (i.e., fragment shaded sample) of fragment shaded VRS tile 68 represents one or more samples of VRS quality group 64, GPU 12 may amplify a fragment shaded VRS tile by applying the set of values generated as result of performing fragment shading of the samples in VRS tile 66 over VRS quality group 64. Specifically, GPU 12 may, for each fragment of fragment shaded VRS tile 68, apply the set of values (e.g., color values) associated with the respective fragment over the one or more samples of VRS quality group 64 represented by the respective sample. In this way, GPU 12 may in effect perform fragment shading on the samples of VRS quality group 64 by only performing fragment shading on only a single quad (e.g., VRS tile 66), thereby improving the performance of GPU 12.

Because fragment shaded VRS tile 68 comprises a quad (2×2) of fragments (i.e., fragment shaded samples), GPU 12 may divide the samples within VRS quality group 64 into four quadrants, each represented by one of the four fragment shaded samples of fragment shaded VRS tile 68. The upper-left fragment of fragment shaded VRS tile 68 may represent the upper-left quadrant of samples of VRS quality group 64, the upper-right fragment of fragment shaded VRS tile 68 may represent the upper-right quadrant of samples of VRS quality group 64, the lower-left fragment of fragment shaded VRS tile 68 may represent the lower-left quadrant of samples of VRS quality group 64, and the lower-right fragment of fragment shaded VRS tile 68 may represent the lower-right quadrant of samples of VRS quality group 64. In the example of FIGS. 5A and 5B, the set of values (e.g., color values) associated with fragment shaded sample 69A may be amplified over quad 58A, the set of values associated with fragment shaded sample 69B may be amplified over quad 58B, the set of values associated with fragment shaded sample 69C may be amplified over quad 58C, and the set of values associated with fragment shaded sample 69D may be amplified over quad 58D.

To that end, GPU 12 may generate a set of stored samples based on the fragment shaded VRS tile 68, where the set of stored samples have at least a color value based on the fragment shaded VRS tile 68, and where the set of stored samples comprises a greater number of samples than in fragment shaded VRS tile 68. In the example of FIG. 5B, because each fragment shaded sample of fragment shaded VRS tile 68 represents a quad in VRS quality group 64, GPU 12 may amplify fragment shaded VRS tile 68 by generating stored sample quads 70A-70D ("stored sample quads 70") that correspond to quads in VRS quality group 64 but have the same color values as one of the corresponding fragment shaded samples 69 of fragment shaded VRS tile 68. Thus, each fragment shaded sample of fragment shaded VRS tile 68 is associated with one of the stored sample quads 70. For example, fragment shaded sample 69A is associated with stored sample quad 70A, fragment shaded sample 69B is associated with stored sample quad 70B, fragment shaded sample 69C is associated with stored sample quad 70C, and fragment shaded sample 69D is associated with stored sample quad 70D.

GPU 12 may amplify fragment shaded VRS tile 68 into stored sample quads 70 by amplifying the set of values associated with each fragment shaded sample of fragment shaded VRS tile 68 across the respective sample's associated stored sample quad. For example, GPU 12 may associate each sample of stored sample quad 70A with the same set of values (e.g., a depth value, a stencil value, one or more color values, and the like) as fragment shaded sample 69A, associate each sample of stored sample quad 70B with the same set of values (e.g., a depth value, a stencil value, one or more color values, and the like) as fragment shaded sample 69B, associate stored sample quad 70C with the same set of values (e.g., a depth value, a stencil value, one or more color values, and the like) as fragment shaded sample 69C, and associate stored sample quad 70D with the same set of values (e.g., a depth value, a stencil value, one or more color values, and the like) as fragment shaded sample 69D. In this way, the depth, stencil, and or color values of a single fragment shaded sample of fragment shaded VRS tile 68 can be spread across multiple stored samples (e.g., one of stored sample quads 70), to in effect perform fragment shading of those multiple samples without actually performing fragment shading of those multiple samples.

Stored sample quads 70 generated by GPU 12 from amplifying fragment shaded VRS tile 68 may correspond with VRS quality group 64 from which GPU 12 generates fragment shaded VRS tile 68. In other words, each of the stored sample quads 70 may correspond with one of the quads 58 that GPU 12 combines into VRS quality group 64, and each stored sample within a particular stored sample quad (e.g., stored sample quad 70A) may correspond with a pixel within a corresponding quad (e.g., quad 58A) combined into VRS quality group 64. In this way, GPU 12 may shade each sample making up VRS quality group 64 by fragment shading VRS tile 66 and amplifying the values of the resulting fragment shaded VRS tile 68 into stored sample quads 70.

GPU 12 may apply the per-sample coverage masks that GPU 12 previously generated when performing per-sample processing as described above, and may additionally perform late per-sample processing, such as late depth testing, on individual samples of stored sample quads 70. For example, GPU 12 may apply the previously-generated coverage masks to discard samples 72A and 72B because GPU 12 had previously determined that those samples do not cover primitive 50. GPU 12 may perform output merger stage 46 to blend pixel representations 73 of the remaining stored samples of stored sample quads 70 to the frame buffer or another render target in memory (e.g., memory 10 or graphics memory). In this way, GPU 12 may be able to perform both early and late testing (e.g., z testing) at a per-pixel level even while performing VRS.

Figure 6A:
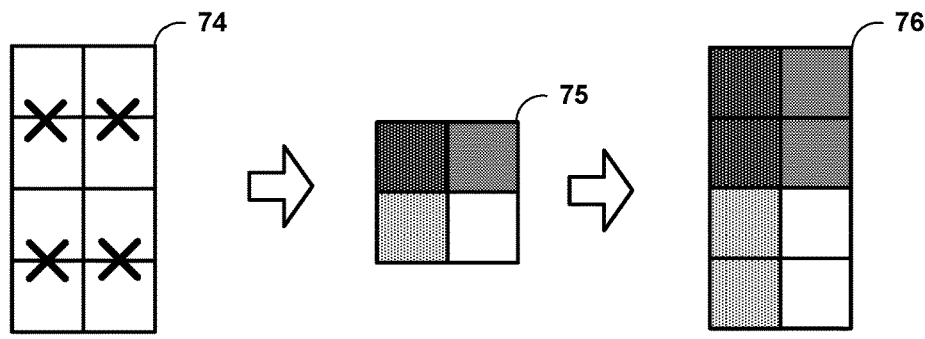
FIGS. 6A-6B illustrate additional examples of variable rate shading that may be performed for a primitive.
Figure 6B:
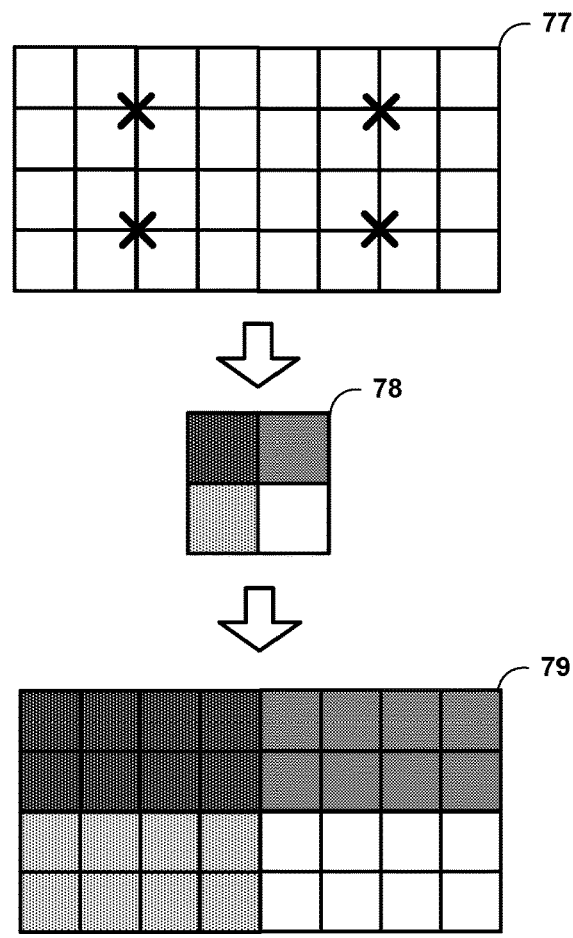

Although variable rate shading is illustrated in FIGS. 5A-5B as fragment shading a single quad to represent a 2×2 group of quads, the techniques illustrated in FIGS. 5A-5B may also be utilized so that GPU 12 may perform fragment shading of a single quad to represent any other arrangement of one or more quads. FIGS. 6A-6B illustrate additional examples of variable rate shading that may be performed for a primitive.

As shown in FIG. 6A, GPU 12 may utilize a single quad to represent a 2×1 arrangement of quads. In other words, a single quad may represent fewer than 4 quads. In this example, GPU 12 may perform fragment shading on samples 74 that is a 4×2 arrangement of samples by fragment shading a single quad to result in fragment shaded quad 75, and by amplifying fragment shaded quad 75 across a 2×1 arrangement of quads to result in stored samples 76.

Similarly, as shown in FIG. 6B, GPU 12 may utilize a single quad to represent a 2×4 arrangement of quads. In this example, GPU 12 may perform fragment shading on samples 77 that is a 4×8 arrangement of samples by fragment shading a single quad to result in fragment shaded quad 78, and by amplifying fragment shaded quad 78 across a 2×4 arrangement of quads to result in stored samples 79.

It should be understood that the VRS techniques described herein may enable a single quad to represent any suitable arrangement of quads, including but not limited to a single quad, a 2×1 arrangement of quads, a 2×2 arrangement of quads, a 4×2 arrangement of quads, a 4×4 arrangement of quads, an 8×4 arrangement of quads, an 8×8 arrangement of quads, a 16×8 arrangement of quads, and the like.

Figure 7:
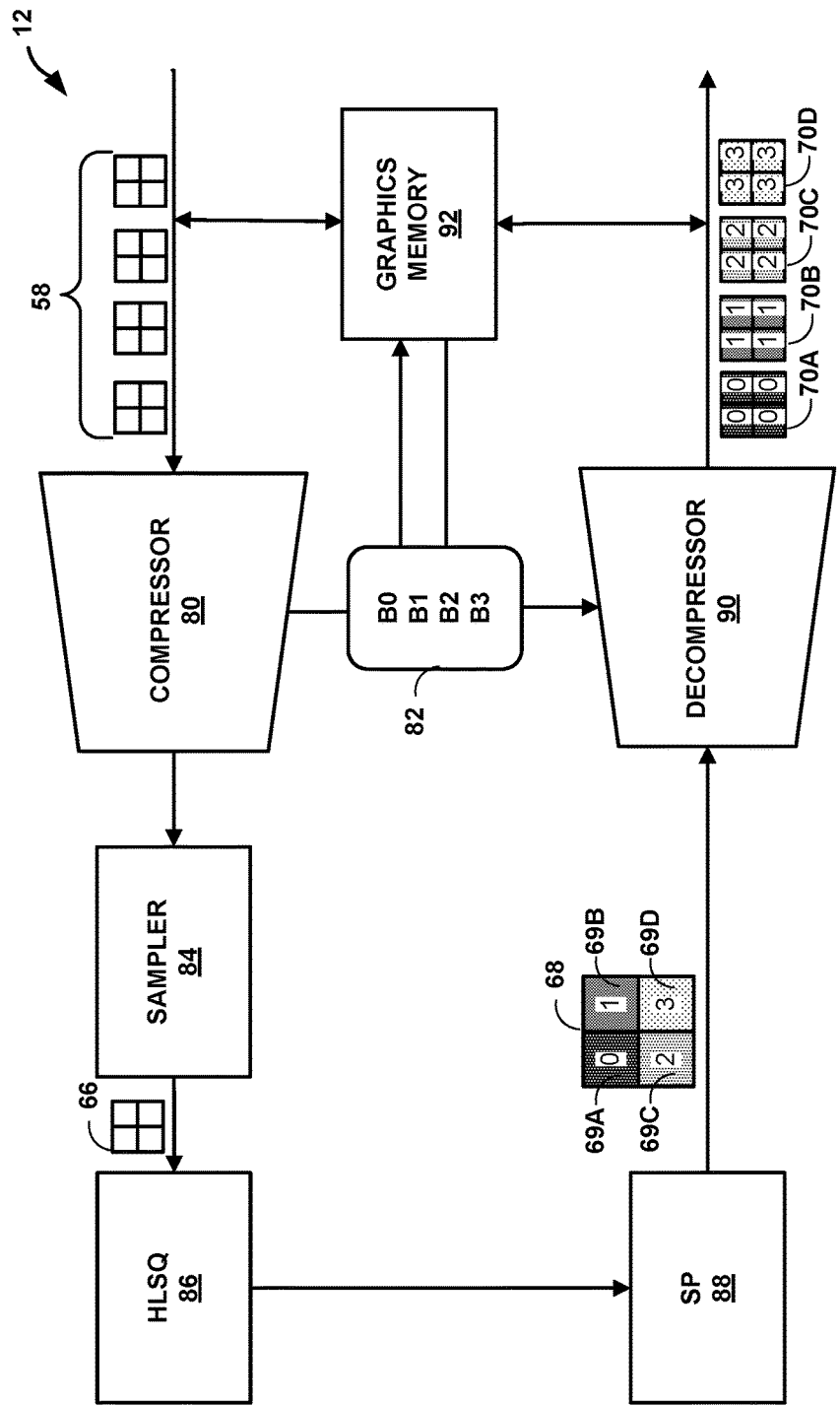
FIG. 7 is a block diagram illustrating example components of a GPU that may perform variable rate shading in accordance with aspects of the present disclosure.

FIG. 7 is a block diagram illustrating example components of GPU 12 that may perform variable rate shading in accordance with aspects of the present disclosure. As shown in FIG. 7, in addition to the components illustrated in FIG. 2, GPU 12 may also include compressor 80, sampler 84, high level sequencer (HLSQ) 86, shader processors (SP) 88, decompressor 90, and graphics memory 92. In some examples, compressor 80 and decompressor 90 may be fixed function hardware units in GPU 12.

Compressor 80 may be configured to receive a plurality of sub portions of a sample and combine the plurality of sub portions into a VRS quality group, and output the VRS quality group along with decompression codes for amplifying a fragment shaded VRS tile into the plurality of sub portions of the sample. As shown in FIG. 7, compressor 80 may receive quads 58 and may generate VRS quality group 64 along with decompression codes 82 that may be used by decompressor 90 to map color values and the like associated with fragment shaded VRS tile 68 across stored sample quads 70.

Each of the individual decompression codes may indicate the pattern of values (e.g., color values, depth values, and the like) within an associated sub portion of samples. Thus, for quads 58, compressor 80 may generate an associated plurality of decompression codes that indicate the pattern by which decompressor 90 may amplify a set of values (e.g., one or more color values) across stored sample quads 70. For example, the decompression codes may indicate whether a particular color is amplified through all four samples of a fragment shaded sample quad, whether two particular colors are each amplified through two samples of a fragment shaded sample quad, whether four particular colors are amplified through individual samples of a fragment shaded sample quad, or whether a particular quad can be discarded by GPU 12 prior to fragment shading (e.g., based on performing per-sample processing described above).

Compressor 80 may store the generated decompression codes 82 into graphics memory 92 as a decompression bitstream. Graphics memory includes one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media. In some examples, graphics memory 92 is on-chip storage or memory that is physically integrated into the integrated circuit of GPU 12. In some instances, because graphics memory 92 is on-chip, GPU 12 may be able to read values from or write values to graphics memory 92 more quickly than reading values from or writing values to system memory 10 via a system bus.

Sampler 84 may be configured to receive the VRS quality group generated by compressor 80 and to generate a VRS tile from the received VRS quality group. In the example of FIG. 7, sampler 84 may receive VRS quality group 64 and may generate VRS tile 66 as a single quad that represents VRS quality group 64. Sampler 84 may send VRS tile 66 to HLSQ 86 to be scheduled for fragment shading by shader processors 88.

HLSQ 86 may be configured to manage and schedule the execution of the data parallel code amongst processing elements within shader processors 88. For example, HLSQ 86 may schedule the execution of blocks of threads and wavefronts of threads on processing elements within shader processors 88. Shader processors 88 may include a plurality of processing elements (e.g., compute units) that are configured to operate on multiple graphics elements (e.g., vertices and pixels) in a parallel manner. In the example of FIG. 7, HLSQ 86 may schedule VRS tile 66 for processing by shader processors 88 by packing VRS tile 66 into waves for optimal processing by shader processors 88.

Shader processors 88 may be configured to execute one or more shader programs (e.g., the consuming shader described above) that are downloaded onto GPU 12 from CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, shader processors 88 may include a plurality of processing units that are configured to operate in parallel, e.g., an SIMD (single instruction multiple data) pipeline. Shader processors 88 may have a program memory that stores shader program instructions and an execution state register, e.g., a program counter register that indicates the current instruction in the program memory being executed or the next instruction to be fetched. Examples of shader programs that execute on shader processors 88 include, for example, vertex shaders, fragment shaders (also referred to as pixel shaders), geometry shaders, hull shaders, domain shaders, compute shaders, and/or unified shaders. In the example of FIG. 7, shader processors 88 may be configured to execute fragment shader stage 44 to perform fragment shading of VRS tile 66 to generate fragment shaded VRS tile 68.

In the example of FIG. 7, fragment shaded VRS tile 68 may be a quad comprising four fragment shaded samples 69A-69D ("fragment shaded samples 69"). Depending on the VRS level each sample in this quad could have its own fragment shading values, or even more than one fragment shading value per pixel if MSAA is being used. Such fragment shading values may include color values (e.g., red, green blue, alpha), depth values, and the like. Alternatively, if a higher level is selected, a single fragment shading value may cover all pixels. It's also possible for the entire quad to be discarded if decompressor 90 determines that the fragment shading value from a previous quad can be used.

Decompressor 90 may be configured to amplify the fragment shaded VRS tile generated by shader processors 90's performance of fragment shader stage 44 into stored samples. Specifically, decompressor 90 may utilize decompression code 82 to amplify the color values (as well as other values such as depth values, stencil values, and the like) of fragment shaded samples 69 in fragment shaded VRS tile 68 to generate stored samples 70. Given the color values for the red, green, blue, and alpha color components indicated by fragment shaded samples 69, decompressor 90 may utilize the particular patterns of colors specified by decompression code 82 to amplify fragment shaded VRS tile 68 to generate stored sample quads 70 that corresponds with quads 58.

In the example of FIG. 7, decompression codes 82 comprises decompression code "B0" associated with quad 58A, decompression code "B1" associated with quad 58B, decompression code "B2" associated with quad 58C, and decompression code "B3" associated with quad 58D. Decompression code "B0" may direct decompressor 90 to generate a quad (i.e., stored sample quad 70A) where each of the samples of stored sample quad 70A is shaded the same red color value as fragment shaded sample 69A of fragment shaded VRS tile 68. Decompression code "B1" may direct decompressor 90 to generate a quad (i.e., stored sample quad 70B) where each of the samples of stored sample quad 70B is shaded the same green color value as fragment shaded sample 69B of fragment shaded VRS tile 68. Decompression code "B2" may direct decompressor 90 to generate a quad (i.e., stored sample quad 70C) where each of the samples of stored sample quad 70C is shaded the same blue color value as fragment shaded sample 69C of fragment shaded VRS tile 68. Decompression code "B3" may direct decompressor 90 to generate a quad (i.e., stored sample quad 70D) where each of the samples of stored sample quad 70D is shaded the same alpha color value as fragment shaded sample 69D of fragment shaded VRS tile 68. In this way, decompressor 90 may amplify fragment shaded VRS tile 68 into stored sample quads 70 that correspond to quads 58.

GPU 12 may apply coverage masks as well as perform per-fragment processing on individual samples of stored sample quads 70, and may perform output merger stage 46 to blend pixel representations of the remaining fragment shaded samples of stored sample quads 70 to the frame buffer or another render target in memory (e.g., memory 10 or graphics memory 92).

Figure 8:
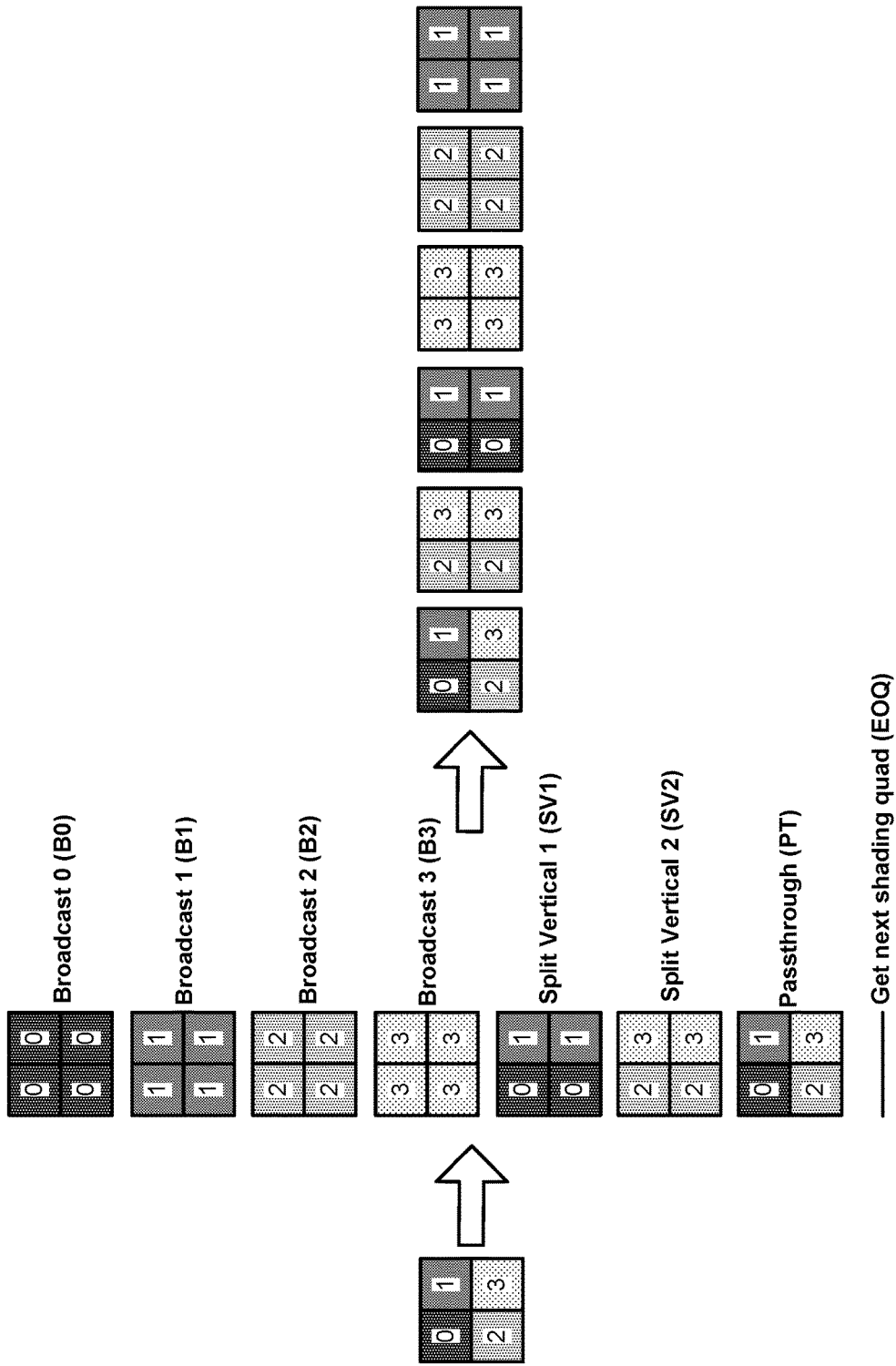
FIG. 8 is a block diagram illustrating example decompression codes that an example decompressor may utilize to amplify a fragment shaded VRS tile.

FIG. 8 is a block diagram illustrating example decompression code that decompressor 90 may utilize to amplify a fragment shaded VRS tile. In some examples, decompression codes 82 illustrated in FIG. 7 may include one or more of these decompression codes. Compressor 80 may, for a particular VRS tile (e.g., VRS tile 66), determine a set of codes (e.g., decompression codes 82) for amplifying the resulting fragment shaded VRS tile (e.g., fragment shaded VRS tile 68) into a plurality of sets of samples having the same color values as the corresponding fragment shaded sample in the fragment shaded VRS tile. It should be understood that the decompression codes described herein are illustrative of one of many techniques for amplifying a fragment shaded VRS tiles, and that GPU 12 may utilize any other suitable techniques for amplifying fragment shaded VRS tiles.

Decompression codes 82 associated with a particular VRS tile (e.g., VRS tile 66) may include an individual decompression code for each sub region (e.g., each quad) of samples 56 making up the VRS tile. Thus, for VRS tile 66 that is made up of four quads 58A-58D, decompression code 82 may include a one-to-one mapping of decompression codes to the individual quads 58A-58D.

The decompression codes for a particular sub portion of samples (e.g., for a particular VRS tile) may provide an indication to decompressor 90 regarding how decompressor 90 may amplify a fragment shaded VRS tile (fragment shaded VRS tile 68) into a sub portion of samples that corresponds to the particular sub portion of samples. Amplifying a fragment shaded VRS tile may include spreading color values, depth values, etc. of each fragment shaded sample of the fragment shaded VRS tile across one or more samples represented by the respective samples.

The decompression codes may be utilized by GPU 12 to determine how to amplify each fragment shaded sample of the fragment shaded VRS tile across one or more samples represented by the respective fragment shaded sample. The Broadcast 0 (B0), Broadcast 1 (B1), Broadcast 2 (B2), and Broadcast 3 (B3) codes may indicate that a set of values associated with one fragment shaded sample of the fragment shaded VRS tile should be amplified across a single quad of samples. In the example of FIG. 8, the B0, B1, B2, and B3 decompression codes may respectively represent different color values (e.g., red, green, blue, and alpha). Thus, the B0 code may indicate that one fragment shaded sample of the fragment shaded VRS tile is associated with a red color value, and that a particular quad of samples is represented by that fragment shaded sample and should correspondingly also be associated with a red color value.

Because the B0, B1, B2, and B3 decompression codes indicate the same color values for an entire quad, these decompression codes may be useful in situations where each fragment shaded sample of a fragment shaded VRS tile represents one or more quads. In the example of FIGS. 5A-5B, each fragment shaded sample (e.g., fragment shaded samples 69A-69D) of fragment shaded VRS tile 68 represents a quad (a 2×2 arrangement of samples). When GPU 12 amplifies fragment shaded VRS tile 68, the set of values (e.g., color values, depth values, and the like) of each fragment shaded samples is spread across a different quad represented by the respective fragment shaded samples to, in effect, perform fragment shading across VRS quality group 64 to generate stored sample quads 70. Because each fragment shaded sample of fragment shaded VRS tile 68 represents a quad, GPU 12 may issue one or more of B0, B1, B2, and B3 decompression codes to instruct how decompressor 90 may amplify color values associated with fragment shaded VRS tile 68 to generate stored sample quads 70, where each sample in stored sample quad 70 may have the same set of values (e.g., color values, depth values, and the like) as the corresponding fragment shaded sample of fragment shaded VRS tile 68.

The Split Vertical 1 (SV1) and Split Vertical 2 (SV2) decompression codes may be useful when each fragment shaded sample of a fragment shaded VRS tile represents fewer than a quad of samples. Specifically, the SV1 and SV2 decompression code may be useful when a fragment shaded VRS tile represents a 2×1 arrangement of sample quads (e.g., samples 74). Because a 2×1 arrangement of sample quads comprises fewer quads than the number of fragments in a fragment shaded VRS tile, the color values of each fragment shaded quad will be amplified over fewer samples than an entire sample quad (e.g., 2 samples). The SV1 and SV2 decompression codes may also be useful when each fragment shaded sample of a fragment shaded VRS tile doesn't represent an integer multiple of quads. For example, given a 3×2 arrangement of quads, each fragment shaded sample of a fragment shaded VRS tile may represent 1 and a half quads. In this instance, the color values of each fragment shaded quad will also be amplified over fewer samples than an entire sample quad (e.g., 2 samples making up half of a sample quad).

The Passthrough (PT) decompression code may be useful when there is a 1-to-1 mapping between a fragment shaded VRS tile and the number of samples it represents. In other words, if a fragment shaded VRS tile represents a single quad, there is a 1-to-1 mapping of each fragment shaded sample of the fragment shaded VRS tile to a sample of that single quad. In this case, GPU 12 does not need to amplify the color values of each of the fragment shaded samples of the fragment shaded VRS tile. Therefore, the color values of the fragment shaded VRS tile can simply be passed through. At the end of decompression codes issued by compressor 80, compressor 80 may issue a Get next shading quad (EOQ) code to indicate the end of decompression codes for amplifying the current fragment shaded VRS tile.

Figure 9:
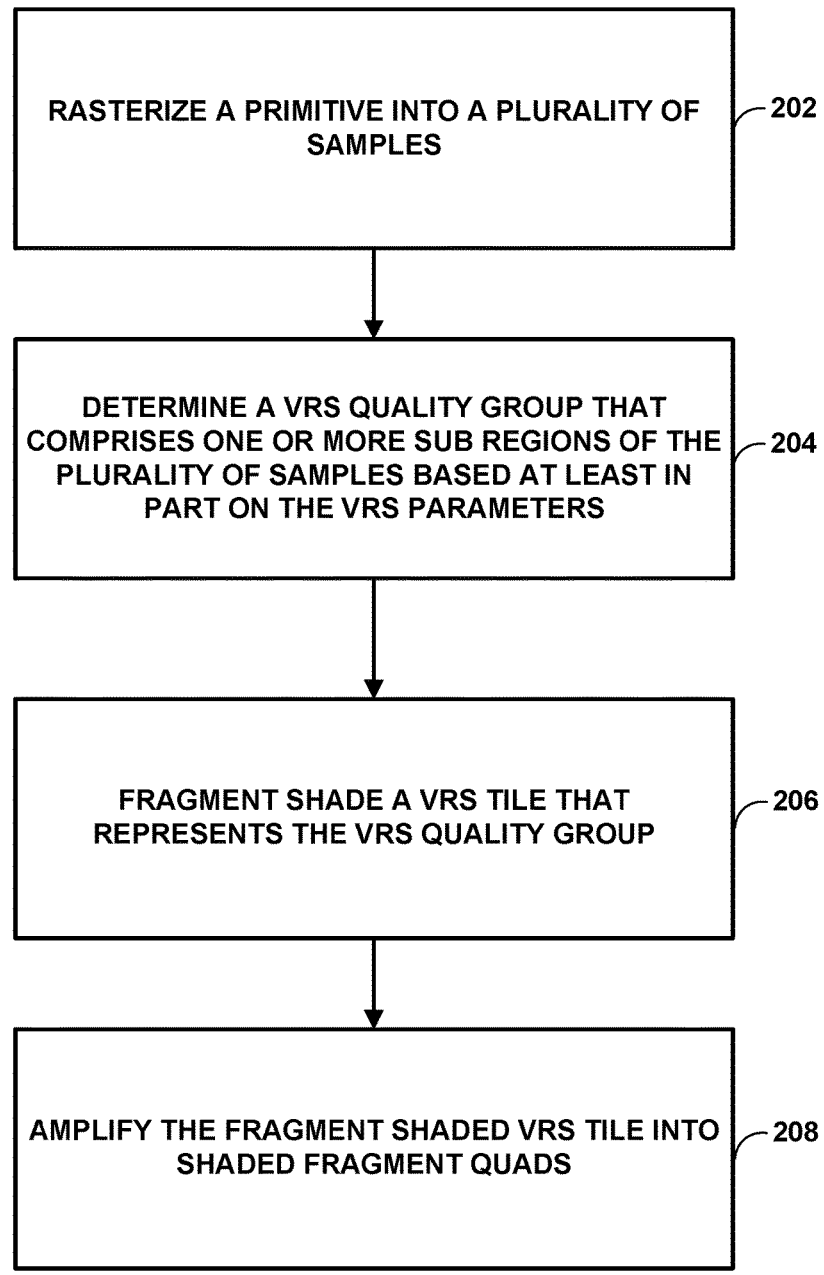
FIG. 9 is a flowchart illustrating an example process for performing variable rate shading.

FIG. 9 is a flowchart illustrating an example process for performing variable rate shading. As shown in FIG. 9, the process may include rasterizing, by GPU 12, a primitive into a plurality of samples, wherein vertices of the primitive are associated with VRS parameters (202). The process may further include determining, by GPU 12, a VRS quality group that comprises one or more sub regions based at least in part on the VRS parameters (204). The process may further include fragment shading, by GPU 12, a VRS tile that represents the VRS quality group, wherein the VRS tile comprises fewer samples than the VRS quality group (206). The process may further include amplifying, by GPU 12, the fragment shaded VRS tile into stored samples that correspond to the VRS quality group (208). In some examples, the process may further include blending, by GPU 12, pixel representations of the stored samples into a framebuffer.

In some examples, determining the VRS quality group may further include determining, by GPU 12, a VRS quality value for each of a plurality of sub regions of the plurality of samples based at least in part on the VRS parameters and combining, by GPU 12, two or more of the plurality of sub regions of the plurality of samples into the VRS quality group based at least in part on the VRS quality value for each of the two or more of the plurality of sub regions.

In some examples, determining the VRS quality value for each of the plurality of sub regions may further include interpolating, by GPU 12 for each one of the plurality of sub regions, the VRS parameters to corners of the respective sub region to determine interpolated VRS parameters for the respective sub region of the plurality of sub regions and determining, by GPU 12 for each one of the plurality of sub regions, the VRS quality value for the respective sub region based at least in part on the interpolated VRS parameters for the respective sub region.

In some examples, interpolating the VRS parameters may further include performing, by GPU 12, barycentric interpolation of the VRS parameters.

In some examples, determining the VRS quality value for the respective sub region may further include determining, by GPU 12, a minimum interpolated VRS parameter based at least in part on the interpolated VRS parameters and applying, by GPU 12, a ramp function to components of the minimum interpolated VRS parameter for the respective sub region. In some examples, combining the two or more of the plurality of sub regions of the plurality of samples into the VRS quality group may further include combining, by GPU 12, the two or more of the plurality of sub regions based at least in part on the VRS quality value for each of the two or more of the plurality of sub regions.

In some examples, the process may further include generating, by GPU 12, a decompression bitstream associated with the VRS quality group, where amplifying the fragment shaded VRS tile into the stored sample regions that correspond to the VRS quality group is based at least in part on the decompression bitstream. In some examples, the decompression bitstream comprises a plurality of decompression codes associated with the at least the sub region of the plurality of sub regions, and amplifying the fragment shaded VRS tile may include generating, by GPU 12, the stored sample regions according to patterns of color values specified by the plurality of decompression codes.

In some examples, the plurality of samples comprises a plurality of sample quads, the VRS quality group that comprises at least a sample quad of the plurality of sample quads, the VRS tile comprises a single quad, the fragment shaded VRS tile comprises a fragment shaded quad, and amplifying the fragment shaded VRS tile into stored samples that correspond to the VRS quality group includes amplifying, by GPU 12, the fragment shaded quad into stored quads that correspond to the VRS quality group.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method of variable rate shading (VRS), the method comprising:
 rasterizing, by a graphics processing unit (GPU), a primitive into a plurality of samples, wherein vertices of the primitive are associated with VRS parameters;

determining, by the GPU, a VRS quality group that comprises one or more sub regions of the plurality of samples based at least in part on the VRS parameters, including:
  determining, by the GPU, a VRS quality value for each of a plurality of sub regions of the plurality of samples based at least in part on the VRS parameters, and
  combining, by the GPU, two or more of the plurality of sub regions of the plurality of samples into the VRS quality group based at least in part on the VRS quality value for each of the two or more of the plurality of sub regions;
fragment shading, by the GPU, a VRS tile that represents the VRS quality group, wherein the VRS tile comprises fewer samples than the VRS quality group; and
amplifying, by the GPU, the fragment shaded VRS tile into stored samples that correspond to the VRS quality group.

2. The method of claim 1, further comprising:
blending, by the GPU, pixel representations of the stored samples into a framebuffer.

3. The method of claim 1, wherein determining the VRS quality value for each of the plurality of sub regions further comprises:
  interpolating, by the GPU for each one of the plurality of sub regions, the VRS parameters to corners of the respective sub region to determine interpolated VRS parameters for the respective sub region of the plurality of sub regions; and
  determining, by the GPU for each one of the plurality of sub regions, the VRS quality value for the respective sub region based at least in part on the interpolated VRS parameters for the respective sub region.

4. The method of claim 3, wherein interpolating the VRS parameters comprises performing, by the GPU, barycentric interpolation of the VRS parameters.

5. The method of claim 3, wherein determining the VRS quality value for the respective sub region comprises:
  determining, by the GPU, a minimum interpolated VRS parameter based at least in part on the interpolated VRS parameters; and
  applying, by the GPU, a ramp function to components of the minimum interpolated VRS parameter for the respective sub region.

6. The method of claim 5, wherein combining the two or more of the plurality of sub regions of the plurality of samples into the VRS quality group comprises:
  combining, by the GPU, the two or more of the plurality of sub regions based at least in part on the VRS quality value for each of the two or more of the plurality of sub regions.

7. The method of claim 1, further comprising:
generating, by the GPU, a decompression bitstream associated with the VRS quality group;
wherein amplifying the fragment shaded VRS tile into the stored samples that correspond to the VRS quality group is based at least in part on the decompression bitstream.

8. The method of claim 7, wherein:
the decompression bitstream comprises a plurality of decompression codes associated with the at least the sub region of the plurality of sub regions; and
amplifying the fragment shaded VRS tile comprises generating, by the GPU, the stored samples according to patterns of color values specified by the plurality of decompression codes.

9. The method of claim 1, wherein:
the plurality of samples comprises a plurality of sample quads;
the VRS quality group comprises at least a sample quad of the plurality of sample quads;
the VRS tile comprises a single sample quad;
the fragment shaded VRS tile comprises a fragment shaded sample quad; and
amplifying the fragment shaded VRS tile into stored samples that correspond to the VRS quality group comprises amplifying, by the GPU, the fragment shaded sample quad into stored sample quads that correspond to the VRS quality group.

10. A device for variable rate shading (VRS), the device comprising:
a memory; and
at least one processor operably coupled to the memory and configured to:
  rasterize a primitive into a plurality of samples, wherein vertices of the primitive are associated with VRS parameters;
  determine a VRS quality group that comprises one or more sub regions of the plurality of samples based at least in part on the VRS parameters, including:
    determine a VRS quality value for each of a plurality of sub regions of the plurality of samples based at least in part on the VRS parameters, and
    combine two or more of the plurality of sub regions of the plurality of samples into the VRS quality group based at least in part on the VRS quality value for each of the two or more of the plurality of sub regions;
  fragment shade a VRS tile that represents the VRS quality group, wherein the VRS tile comprises fewer samples than the VRS quality group; and
  amplify the fragment shaded VRS tile into stored samples that correspond to the VRS quality group.

11. The device of claim 10, wherein the at least one processor is further configured to:
blend pixel representations of the stored samples into a framebuffer in the memory.

12. The device of claim 10, wherein the at least one processor is further configured to:
  interpolate, for each one of the plurality of sub regions, the VRS parameters to corners of the respective sub region to determine interpolated VRS parameters for the respective sub region of the plurality of sub regions; and
  determine, for each one of the plurality of sub regions, the VRS quality value for the respective sub region based at least in part on the interpolated VRS parameters for the respective sub region.

13. The device of claim 12, wherein the at least one processor is further configured to:
perform barycentric interpolation of the VRS parameters.

14. The device of claim 12, wherein the at least one processor is further configured to:
  determine a minimum interpolated VRS parameter based at least in part on the interpolated VRS parameters; and
  apple a ramp function to components of the minimum interpolated VRS parameter for the respective sub region.

15. The device of claim 14, wherein the at least one processor is further configured to:
  combine the two or more of the plurality of sub regions based at least in part on the VRS quality value for each of the two or more of the plurality of sub regions.

16. An apparatus for variable rate shading (VRS), the apparatus comprising:
   means for rasterizing a primitive into a plurality of samples, wherein vertices of the primitive are associated with VRS parameters;
   means for determining a VRS quality group that comprises one or more sub regions of the plurality of samples based at least in part on the VRS parameters, including:
      means for determining a VRS quality value for each of a plurality of sub regions of the plurality of samples based at least in part on the VRS parameters, and
      means for combining two or more of the plurality of sub regions of the plurality of samples into the VRS quality group based at least in part on the VRS quality value for each of the two or more of the plurality of sub regions;
   means for fragment shading a VRS tile that represents the VRS quality group, wherein the VRS tile comprises fewer samples than the VRS quality group; and
   means for amplifying the fragment shaded VRS tile into stored samples that correspond to the VRS quality group.

17. The apparatus of claim 16, further comprising:
   means for blending pixel representations of the stored samples into a framebuffer.

18. The apparatus of claim 16, wherein the means for determining the VRS quality value for each of the plurality of sub regions further comprises:
   means for interpolating, for each one of the plurality of sub regions, the VRS parameters to corners of the respective sub region to determine interpolated VRS parameters for the respective sub region of the plurality of sub regions; and
   means for determining, for each one of the plurality of sub regions, the VRS quality value for the respective sub region based at least in part on the interpolated VRS parameters for the respective sub region.

19. The apparatus of claim 18, wherein the means for interpolating the VRS parameters comprises means for performing barycentric interpolation of the VRS parameters.

20. The apparatus of claim 18, wherein the means for determining the VRS quality value for the respective sub region comprises:
   means for determining a minimum interpolated VRS parameter based at least in part on the interpolated VRS parameters; and
   means for applying a ramp function to components of the minimum interpolated VRS parameter for the respective sub region.

21. The apparatus of claim 20, wherein the means for combining the two or more of the plurality of sub regions of the plurality of samples into the VRS quality group comprises:
   means for combining the two or more of the plurality of sub regions based at least in part on the VRS quality value for each of the two or more of the plurality of sub regions.

22. A non-transitory computer readable storage medium storing instructions that upon execution by one or more processors cause the one or more processors to:
   rasterize a primitive into a plurality of samples, wherein vertices of the primitive are associated with VRS parameters;
   determine a VRS quality group that comprises one or more sub regions of the plurality of samples based at least in part on the VRS parameters, including:
      determine a VRS quality value for each of a plurality of sub regions of the plurality of samples based at least in part on the VRS parameters, and
      combine two or more of the plurality of sub regions of the plurality of samples into the VRS quality group based at least in part on the VRS quality value for each of the two or more of the plurality of sub regions;
   fragment shade a VRS tile that represents the VRS quality group, wherein the VRS tile comprises fewer samples than the VRS quality group; and
   amplify the fragment shaded VRS tile into stored samples that correspond to the VRS quality group.

23. The non-transitory computer readable storage medium of claim 22, wherein the instructions, upon execution by the one or more processors, further cause the one or more processors to:
   interpolate, for each one of the plurality of sub regions, the VRS parameters to corners of the respective sub region to determine interpolated VRS parameters for the respective sub region of the plurality of sub regions; and
   determine, for each one of the plurality of sub regions, the VRS quality value for the respective sub region based at least in part on the interpolated VRS parameters for the respective sub region.

24. The non-transitory computer readable storage medium of claim 23, wherein the instructions, upon execution by the one or more processors, further cause the one or more processors to:
   perform barycentric interpolation of the VRS parameters.

25. The non-transitory computer readable storage medium of claim 23, wherein the instructions, upon execution by the one or more processors, further cause the one or more processors to:
   determine a minimum interpolated VRS parameter based at least in part on the interpolated VRS parameters; and
   apple a ramp function to components of the minimum interpolated VRS parameter for the respective sub region.

26. The non-transitory computer readable storage medium of claim 25, wherein the instructions, upon execution by the one or more processors, further cause the one or more processors to:
   combine the two or more of the plurality of sub regions based at least in part on the VRS quality value for each of the two or more of the plurality of sub regions.

* * * * *